US012742094B2

(12) United States Patent
Hatase et al.

(10) Patent No.: US 12,742,094 B2
(45) Date of Patent: Sep. 22, 2026

(54) SILICONE CHAIN-CONTAINING POLYMER AND COATING COMPOSITION CONTAINING SAID POLYMER

(71) Applicant: DIC Corporation, Tokyo (JP)

(72) Inventors: Masaki Hatase, Ichihara (JP); Ryohei Shimizu, Ichihara (JP); Junpei Ueno, Ichihara (JP); Hideya Suzuki, Ichihara (JP)

(73) Assignee: DIC Corporation, Tokyo (JP)

( * ) Notice: Subject to any disclaimer, the term of this patent is extended or adjusted under 35 U.S.C. 154(b) by 653 days.

(21) Appl. No.: 18/022,542

(22) PCT Filed: Sep. 2, 2021

(86) PCT No.: PCT/JP2021/032218
§ 371 (c)(1),
(2) Date: Feb. 22, 2023

(87) PCT Pub. No.: WO2022/059492
PCT Pub. Date: Mar. 24, 2022

(65) Prior Publication Data

US 2023/0312977 A1 Oct. 5, 2023

(30) Foreign Application Priority Data

Sep. 15, 2020 (JP) ................................ 2020-154452

(51) Int. Cl.
*C09D 183/10* (2006.01)
*C08F 293/00* (2006.01)

(52) U.S. Cl.
CPC .......... *C09D 183/10* (2013.01); *C08F 293/00* (2013.01)

(58) Field of Classification Search
None
See application file for complete search history.

(56) References Cited

U.S. PATENT DOCUMENTS

2002/0143087 A1 10/2002 Haubennestel et al.
2003/0222048 A1 12/2003 Asakawa et al.
2008/0039544 A1* 2/2008 Wu ......................... C08L 33/14 522/39
2011/0275734 A1 11/2011 Scales et al.

FOREIGN PATENT DOCUMENTS

| | | | |
|---|---|---|---|
| JP | S63-270738 A | | 11/1988 |
| JP | 2001-151834 A | | 6/2001 |
| JP | 2002-179991 A | | 6/2002 |
| JP | 2006-213661 A | | 8/2006 |
| JP | 2011-213968 A | | 10/2011 |
| JP | 2013-532196 A | | 8/2013 |
| JP | 2015-168719 A | | 9/2015 |
| JP | 2018199765 A | * | 12/2018 |
| JP | 2019-163449 A | | 9/2019 |

OTHER PUBLICATIONS

JP2018199765 English machine translation, prepared Aug. 26, 2025. (Year: 2025).*

Silaplane technical disclosure, JNC America, Feb. 6, 2015. (Year: 2015).*

Jan Kurjata et al., "Synthesis of poly[dimethylsiloxane-block-oligo(ethylene glycol) methyl ether methacrylate]: an amphiphilic copolymer with a comb-like block", Polymer, vol. 45 , 2004, pp. 6111-6121. (cited in the Apr. 30, 2025 CN OA).

* cited by examiner

*Primary Examiner* — Christopher M Rodd
(74) *Attorney, Agent, or Firm* — Troutman Pepper Locke LLP; James E. Armstrong, IV; Tanya Leavy

(57) ABSTRACT

Provided is a polymer functioning as a leveling agent that imparts high smoothness to a coating film without causing a defect on the surface of the coating film. Specifically, a silicone chain-containing polymer having a silicone chain on one terminal, in which the silicone chain has a number average molecular weight in a range of 2000 to 20000, and a polymerizable unsaturated group is not contained.

4 Claims, No Drawings

SILICONE CHAIN-CONTAINING POLYMER AND COATING COMPOSITION CONTAINING SAID POLYMER

TECHNICAL FIELD

The present invention relates to a silicone chain-containing polymer and a coating composition containing the polymer.

BACKGROUND ART

A leveling agent is added to smooth a coating film that is obtained by applying a coating composition such as a coating material composition or a resist composition. Specifically, by adding the leveling agent to the coating composition, the leveling agent is aligned on the surface of the coating film to decrease a surface tension of the coating film, and thus, it is possible to smooth the coating film to be obtained. In the coating film with a smoothed surface, the occurrence of cissing or unevenness can be reduced.

There are various usages of the leveling agent, and for example, the leveling agent is also used in a color resist composition that is used for producing a color filter for a liquid crystal display. The production of the color filter, in general, includes a step of applying the color resist composition onto a glass substrate by a coating method such as spin coating or slit coating, of exposing, and then, developing the coating film after drying with a mask to form a colored pattern. In this case, in a case where the smoothness of the coating film is not excellent and there is unevenness in the film thickness, or in a case where there is coating unevenness, cis sing, or the like, color unevenness of pixels may occur.

By adding the leveling agent to the color resist composition, the smoothness of the coating film to be obtained is improved, and thus, it is possible for red (R), green (G), and blue (B) pixels and the surface of a black matrix (BM) formed between the pixels to exhibit high smoothness, and it is possible to obtain the color filter with less color unevenness.

As a leveling agent that imparts smoothness to such a coating film, a polymer leveling agent is proposed (PTL 1).

CITATION LIST

Patent Literature

PTL 1: JP2002-179991A

SUMMARY OF INVENTION

Technical Problem

In the polymer leveling agent of PTL 1, a macromonomer is introduced to base molecules by free radical copolymerization or ion copolymerization. In a case where the macromonomer has a silicone chain, the polymer leveling agent of PTL 1 has a plurality of silicone chains in one polymer, but there is a problem that the leveling agent having a plurality of silicone chains causes a defect on the surface of the coating film.

An object of the invention is to provide a polymer functioning as a leveling agent that imparts high smoothness to a coating film without causing a defect on the surface of the coating film.

Solution to Problem

As a result of intensive studies of the present inventors for attaining an object described above, it has been found that excellent leveling performance can be obtained without causing a defect on the surface of the coating film in the case of a silicone chain-containing polymer that has a specific silicone chain on one terminal and does not contain a polymerizable unsaturated group, and thus, the invention has been completed.

That is, the invention relates to a silicone chain-containing polymer having a silicone chain on one terminal, in which the silicone chain has a number average molecular weight in a range of 2000 to 20000, and a polymerizable unsaturated group is not contained.

Advantageous Effects of Invention

According to the invention, it is possible to provide the polymer functioning as the leveling agent that imparts high smoothness to the coating film without causing a defect on the surface of the coating film.

DESCRIPTION OF EMBODIMENTS

Hereinafter, one embodiment of the invention will be described. The invention is not limited to the following embodiment, and can be implemented with a suitable change within a range not impairing the effects of the invention.

Note that, in the specification of this application, "(meth) acrylate" indicates one or both of acrylate and methacrylate.

[Polymer]

A polymer of the invention has a silicone chain having a number average molecular weight in a range of 2000 to 20000 on one terminal, and does not contain a polymerizable unsaturated group.

Note that, "one terminal" indicates any one terminal of a main chain (the longest molecular chain among molecular chains configuring the polymer) of the polymer.

The polymer of the invention has a specific silicone chain only on one terminal and does not contain a polymerizable unsaturated group, and thus, when the polymer of the invention is used as an additive of a coating composition, it is possible to exhibit leveling performance without impairing compatibility with respect to a base polymer or a solvent of the coating composition. Since the compatibility is not impaired, it is possible to prevent a defect from occurring on the surface of the coating film to be obtained.

The number average molecular weight of the silicone chain is in a range of 2000 to 20000, preferably in a range of 3000 to 20000, more preferably in a range of 3500 to 15000, and even more preferably in a range of 4000 to 12000.

The number average molecular weight of the silicone chain is measured by a method described in Examples.

The ratio of the silicone chain, for example, is in a range of 5 to 95% by mass, preferably in a range of 10 to 90% by mass, more preferably in a range of 15 to 80% by mass, and even more preferably in a range of 20 to 70% by mass.

Here, the ratio of the silicone chain is a value based on the mass of the polymer of the invention (Mass of Silicone Chain/Mass of Polymer). The ratio of the silicone chain is a value that is calculated from the preparation ratio of a raw material in production, and can be adjusted by the preparation ratio of the raw material of a silicone compound used for producing the polymer of the invention.

The silicone chain of the polymer of the invention is preferably a silicone chain represented by Formula (1) described below.

[Chem. 1]

(1)

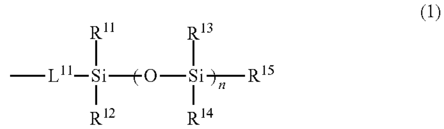

(In Formula (1) described above, $R^{11}$, $R^{12}$, $R^{13}$, $R^{14}$, and $R^{15}$ are each independently an alkyl group having 1 to 18 carbon atoms or a phenyl group, $L^{11}$ is a divalent organic group or a single bond, and n is an integer.)

The alkyl group having 1 to 18 carbon atoms of $R^{11}$, $R^{12}$, $R^{13}$, $R^{14}$, and $R^{15}$ is preferably an alkyl group having 1 to 6 carbon atoms.

It is preferable that $R^{11}$, $R^{12}$, $R^{13}$ and $R^{14}$ are a methyl group, and it is preferable that $R^{15}$ is an alkyl group having 1 to 6 carbon atoms.

n is preferably an integer in a range of 5 to 300, more preferably an integer in a range of 10 to 250, even more preferably an integer in a range of 20 to 200, and most preferably an integer in a range of 25 to 200.

The divalent organic group of $L^{11}$ is preferably an alkylene group having 1 to 50 carbon atoms or an alkylene oxy group having 1 to 50 carbon atoms.

Examples of the alkylene group having 1 to 50 carbon atoms of $L^{11}$ include a methylene group, an ethylene group, an n-propylene group, an n-butylene group, an n-pentylene group, an n-hexylene group, an n-heptylene group, an n-octylene group, an n-nonylene group, an n-decylene group, an n-dodecylene group, an isopropylene group, a 2-methyl propylene group, a 2-methyl hexylene group, and a tetramethyl ethylene group.

The alkylene group having 1 to 50 carbon atoms of $L^{11}$ is preferably an alkylene group having 1 to 15 carbon atoms, more preferably an alkylene group having 1 to 5 carbon atoms, and even more preferably a methylene group, an ethylene group, an n-propylene group, or an isopropylene group.

The alkylene oxy group having 1 to 50 carbon atoms of $L^{11}$, for example, is a group in which one or more $—CH_2—$ in the alkylene group are substituted with —O—.

The alkylene oxy group having 1 to 50 carbon atoms of $L^{11}$ is preferably an alkylene oxy group having 1 to 15 carbon atoms, more preferably an alkylene oxy group having 1 to 8 carbon atoms, and even more preferably a methylene oxy group, an ethylene oxy group, a propylene oxy group, an oxytrimethylene group, a butylene oxy group, an oxytetramethylene group, a pentylene oxy group, a heptylene oxy group, or an octylene oxy group.

In a case where the divalent organic group of $L^{11}$ is the alkylene group having 1 to 50 carbon atoms or the alkylene oxy group having 1 to 50 carbon atoms, in such a divalent organic group, a part of $—CH_2—$ may be substituted with a carbonyl group (—C(═O)—), a phenylene group, and an amide bond or a urethane bond, and the carbon atom may be substituted with a hydroxyl group or the like.

Insofar as the polymer of the invention is the polymer that has the silicone chain described above on the terminal and does not contain the polymerizable unsaturated group, the structure of the polymer part is not particularly limited. Since the polymer of the invention is preferably used as the additive of the coating composition, it is preferable that the structure of the polymer part includes a structure exhibiting compatibility with respect to the base polymer of the coating composition.

The polymer of the invention is preferably a polymer that contains a polymerizable monomer (2) having one or more selected from an alkyl group having 1 to 18 carbon atoms, an aromatic group having 6 to 18 carbon atoms, a group containing a polyoxyalkylene chain, and a group containing a polyester chain as a polymeric component, and has a silicone chain on one terminal.

The polymer of the polymerizable monomer (2) is capable of exhibiting high compatibility with respect to the base polymer of the coating composition.

Note that, the "polymeric component" indicates a component that configures the polymer, and does not include a solvent, a polymerization initiator, or the like that does not configure the polymer.

In the invention, the "polymerizable monomer" indicates a compound having a polymerizable unsaturated group, and examples of the polymerizable unsaturated group of the polymerizable monomer (2) include a (meth)acryloyl group, a (meth)acryloyl oxy group, a (meth)acryloyl amide group, a vinyl ether group, an allyl group, a styryl group, a (meth)acryloyl amino group, and a maleimide group. Among them, the (meth)acryloyl group and the (meth) acryloyl oxy group are preferable from the viewpoint of excellent availability of the raw material or excellent polymerization reactivity.

The alkyl group having 1 to 18 carbon atoms of the polymerizable monomer (2) may be any of a linear alkyl group, a branched alkyl group, and a cyclic alkyl group, and specific examples thereof may include a methyl group, an ethyl group, a normal propyl group, an isopropyl group, an n-butyl group, a t-butyl group, an n-hexyl group, a cyclohexyl group, an n-octyl group, a hexadecyl group, and the like.

The alkyl group having 1 to 18 carbon atoms of the polymerizable monomer (2) is preferably an alkyl group having 1 to 6 carbon atoms.

The alkyl group having 1 to 18 carbon atoms of the polymerizable monomer (2) may have an ether bond. The alkyl group having 1 to 18 carbon atoms and an ether bond is a group in which $—CH_2—$ in an alkyl group is substituted with an ether bond (—O—), and includes an alkylene oxyalkyl group having 2 to 18 carbon atoms, a polyoxyalkylene alkyl group having 3 to 18 carbon atoms, and an oxacycloalkyl group having 2 to 18 carbon atoms.

Examples of the aromatic group having 6 to 18 carbon atoms of the polymerizable monomer (2) include a phenyl group, a naphthyl group, an anthracen-1-yl group, a phenanthren-1-yl group, and the like.

The group containing a (poly)oxyalkylene chain of the polymerizable monomer (2) is a monovalent group containing a repeating part of oxyalkylene or a divalent linking group containing a repeating part of oxyalkylene.

In a case where the polymerizable unsaturated group of the polymerizable monomer (2) is the (meth)acryloyl group, the polymerizable monomer having the group containing a (poly)oxyalkylene chain, for example, is a compound represented by General Formula (2-poa1) or (2-poa2) described below.

[Chem. 2]

(2-poa1)

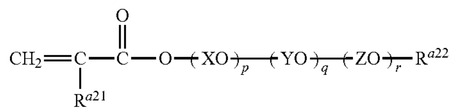

(2-poa2)

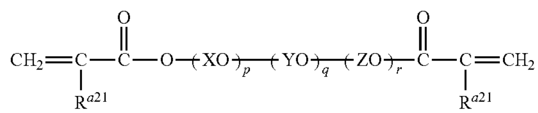

(In Formulae (2-poa1) and (2-poa2) described above, $R^{a21}$ is each independently a hydrogen atom or a methyl group, $R^{a22}$ is a hydrogen atom or an alkyl group having 1 to 18 carbon atoms, p is an integer of 0 or more, q is an integer of 0 or more, r is an integer of 0 or more, and p+q+r is an integer of 1 or more, and X, Y, and Z are each independently an alkylene group having 1 to 6 carbon atoms.)

In Formulae (2-poa1) and (2-poa2) described above, a group represented by $—(XO)_p—(YO)_q—(ZO)_r—R^{a22}$ and a group represented by $—(XO)_p—(YO)_q—(ZO)_r—$ correspond to the group containing a (poly)oxyalkylene chain.

In Formulae (2-poa1) and (2-poa2) described above, the alkylene group having 1 to 6 carbon atoms of X, Y, and Z is preferably an alkylene group having 2 to 4 carbon atoms.

Examples of the polymerizable monomer (2) having the alkyl group having 1 to 18 carbon atoms, in which the polymerizable unsaturated group is the (meth)acryloyl group, include alkyl ester of a (meth)acrylic acid having 1 to 18 carbon atoms, such as methyl (meth)acrylate, ethyl (meth)acrylate, n-propyl (meth)acrylate, isopropyl (meth) acrylate, n-butyl (meth)acrylate, s-butyl (meth)acrylate, isobutyl (meth)acrylate, t-butyl (meth)acrylate, n-pentyl (meth)acrylate, n-hexyl (meth)acrylate, n-heptyl (meth) acrylate, n-octyl (meth)acrylate, 2-ethyl hexyl (meth)acrylate, decyl (meth)acrylate, dodecyl (meth)acrylate, stearyl (meth)acrylate, and isostearyl (meth)acrylate; and cross-linked cyclic alkyl ester of a (meth)acrylic acid having 1 to 18 carbon atoms, such as dicyclopentanyl oxyl ethyl (meth) acrylate, isobornyl oxyl ethyl (meth)acrylate, isobornyl (meth)acrylate, adamantyl (meth)acrylate, dimethyl adamantyl (meth)acrylate, dicyclopentanyl (meth)acrylate, and dicyclopentenyl (meth)acrylate.

Examples of the polymerizable monomer (2) having the hydroxyalkyl group having 1 to 18 carbon atoms, in which the polymerizable unsaturated group is the (meth)acryloyl group, include 2-hydroxyethyl (meth)acrylate, 2-hydroxypropyl (meth)acrylate, 2-hydroxybutyl (meth)acrylate, 4-hydroxy(meth)acrylate, 1,4-cyclohexane dimethanol mono (meth)acrylate, and 2,3-dihydroxypropyl (meth)acrylate.

Examples of the polymerizable monomer (2) having the phenyl alkyl group having 7 to 18 carbon atoms or the phenoxyalkyl group having 7 to 18 carbon atoms, in which the polymerizable unsaturated group is the (meth)acryloyl group, include benzyl (meth)acrylate, 2-phenoxymethyl (meth)acrylate, 2-phenoxyethyl (meth)acrylate, and 2-hydroxy-3-phenoxypropyl (meth)acrylate.

Examples of the polymerizable monomer (2) having the alkyl group having 1 to 18 carbon atoms, in which the polymerizable unsaturated group is the vinyl ether group, include alkyl vinyl ether such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethyl hexyl vinyl ether, and cyclohexyl vinyl ether, cycloalkyl vinyl ether, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, 1-hydroxypropyl vinyl ether, 2-hydroxypropyl vinyl ether, 1-hydroxybutyl vinyl ether, 2-hydroxybutyl vinyl ether, 3-hydroxybutyl vinyl ether, 3-hydroxy-2-methyl propyl vinyl ether, 4-hydroxy-2-methyl butyl vinyl ether, 4-hydroxycyclohexyl vinyl ether, and cyclohexane-1,4-dimethanol monovinyl ether.

Examples of the polymerizable monomer (2) having the alkyl group having 1 to 18 carbon atoms, in which the polymerizable unsaturated group is the allyl group, include 2-hydroxyethyl allyl ether, 4-hydroxybutyl allyl ether, and glycerol monoallyl ether.

Examples of the polymerizable monomer (2) having the aromatic group having 6 to 18 carbon atoms include styrene, a-methyl styrene, p-methyl styrene, and p-methoxystyrene.

Examples of the polymerizable monomer (2) having the alkyl group having 1 to 18 carbon atoms, in which the polymerizable unsaturated group is the (meth)acryloyl amino group, include N,N-dimethyl acrylamide, N,N-diethyl acrylamide, N-isopropyl acrylamide, diacetone acrylamide, and acryloyl morpholine.

Examples of the polymerizable monomer (2) having the alkyl group having 1 to 18 carbon atoms, in which the polymerizable unsaturated group is the maleimide group, include methyl maleimide, ethyl maleimide, propyl maleimide, butyl maleimide, hexyl maleimide, octyl maleimide, dodecyl maleimide, stearyl maleimide, and cyclohexyl maleimide.

Examples of the polymerizable monomer (2) having the group containing a polyoxyalkylene chain, in which the polymerizable unsaturated group is the (meth)acryloyl group, include polypropylene glycol mono(meth)acrylate, polyethylene glycol mono(meth)acrylate, polytrimethylene glycol mono(meth)acrylate, polytetramethylene glycol mono(meth)acrylate, poly(ethylene glycol/propylene glycol) mono(meth)acrylate, polyethylene glycol/polypropylene glycol mono(meth)acrylate, poly(ethylene glycol/tetramethylene glycol) mono(meth)acrylate, polyethylene glycol/polytetramethylene glycol mono(meth)acrylate, poly (propylene glycol/tetramethylene glycol) mono(meth)acrylate, polypropylene glycol/polytetramethylene glycol mono (meth)acrylate, poly(propylene glycol/1,2-butylene glycol) mono(meth)acrylate, polypropylene glycol/poly1,2-butylene glycol mono(meth)acrylate, poly(ethylene glycol/1,2-butylene glycol) mono(meth)acrylate, polyethylene glycol/poly1,2-butylene glycol mono(meth)acrylate, poly (tetraethylene glycol/1,2-butylene glycol) mono(meth) acrylate, polytetraethylene glycol/poly1,2-butylene glycol mono(meth)acrylate, poly1,2-butylene glycol mono(meth) acrylate, poly(ethylene glycol/trimethylene glycol) mono (meth)acrylate, polyethylene glycol/polytrimethylene glycol mono(meth)acrylate, poly(propylene glycol/trimethylene glycol) mono(meth)acrylate, polypropylene glycol/polytrimethylene glycol mono(meth)acrylate, poly(trimethylene glycol/tetramethylene glycol) mono(meth)acrylate, polytrimethylene glycol/polytetramethylene glycol mono(meth) acrylate, poly(1,2-butylene glycol/trimethylene glycol) mono(meth)acrylate, poly1,2-butylene glycol/polytrimethylene glycol mono(meth)acrylate, 2-hydroxyethyl (meth) acrylate, 2-hydroxypropyl (meth)acrylate, 2-hydroxybutyl (meth)acrylate, 4-hydroxybutyl (meth)acrylate, poly(1,2-butylene glycol/tetramethylene glycol) mono(meth)acrylate, and poly1,2-butylene glycol/polytetramethylene glycol mono(meth)acrylate.

Note that, the "poly(ethylene glycol/propylene glycol)" described above indicates a random copolymer of ethylene glycol and propylene glycol, and the "polyethylene glycol/polypropylene glycol" indicates a block copolymer of ethylene glycol and propylene glycol.

The polymerizable monomer (2) is preferably one or more types selected from the group consisting of a compound represented by Formula (2-1) described below, a compound represented by Formula (2-2) described below, a compound represented by Formula (2-3) described below, a compound represented by Formula (2-4) described below, and a compound represented by Formula (2-5) described below, and more preferably one or more types selected from the group consisting of the compound represented by Formula (2-1) described below, the compound represented by Formula (2-2) described below, the compound represented by Formula (2-3) described below, and the compound represented by Formula (2-4) described below.

In a case where the polymer of the invention is used as the leveling agent, such compounds are capable of exhibiting high compatibility.

[Chem. 3]

(2-1)

(2-2)

(2-3)

(2-4)

(2-5)

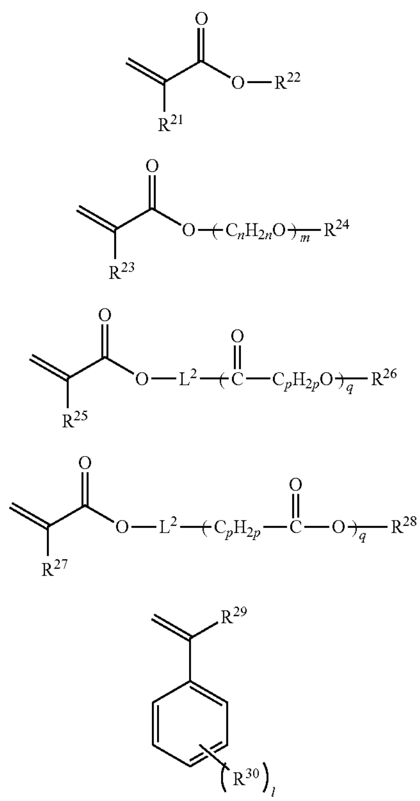

(In Formulae (2-1), (2-2), (2-3), (2-4), and (2-5) described above, $R^{21}$ is a hydrogen atom or a methyl group, $R^{22}$ is an alkyl group having 1 to 18 carbon atoms, $R^{23}$ is a hydrogen atom or a methyl group, $R^{24}$ is a hydrogen atom or an alkyl group having 1 to 18 carbon atoms, $R^{25}$ is a hydrogen atom or a methyl group, $R^{26}$ is an alkyl group having 1 to 18 carbon atoms or an alkyl group having 1 to 18 carbon atoms and an ether bond, $R^{27}$ is a hydrogen atom or a methyl group, $R^{28}$ is an alkyl group having 1 to 18 carbon atoms or an alkyl group having 1 to 18 carbon atoms and an ether bond, $L^2$ is a divalent organic group, $R^{29}$ is a hydrogen atom or a methyl group, $R^{30}$ is each independently an alkyl group having 1 to 6 carbon atoms or an alkoxy group having 1 to 6 carbon atoms, and n is an integer in a range of 1 to 4, m is an integer in a range of 1 to 200, p is an integer in a range of 1 to 10, q is an integer in a range of 1 to 100, and 1 is an integer in a range of 0 to 5.)

Examples of the divalent organic group of $L^2$ in Formulae (2-3) and (2-4) described above include the same divalent organic group as that of $L^{11}$.

The polymerizable monomer (2) can be produced by a known method.

In addition, a commercially available product may be used as the polymerizable monomer (2). Examples of the commercially available product of the polymerizable monomer (2) having the group containing a polyoxyalkylene chain, in which the polymerizable unsaturated group is the (meth)acryloyl group, include "NK Ester M-20G", "NK Ester M-40G", "NK Ester M-90G", "NK Ester M-230G", "NK Ester AM-90G", "NK Ester AMP-10G", "NK Ester AMP-20G", and "NK Ester AMP-60G", manufactured by SHIN NAKAMURA CHEMICAL CO., LTD., "BLEMMER PE-90", "BLEMMER PE-200", "BLEMMER PE-350", "BLEMMER PME-100", "BLEMMER PME-200", "BLEMMER PME-400", "BLEMMER PME-4000", "BLEMMER PP-1000", "BLEMMER PP-500", "BLEMMER PP-800", "BLEMMER 70PEP-350B", "BLEMMER 55PET-800", "BLEMMER 50POEP-800B", "BLEMMER 10PPB-500B", "BLEMMER NKH-5050", "BLEMMER AP-400", and "BLEMMER AE-350", manufactured by NOF CORPORATION, PLACCEL F series manufactured by Daicel Corporation, and Viscoat series manufactured by OSAKA ORGANIC CHEMICAL INDUSTRY LTD.

In a case where the polymer of the invention is the polymer of the polymerizable monomer (2) having one or more selected from the alkyl group having 1 to 18 carbon atoms, the aromatic group having 6 to 18 carbon atoms, and the group containing a polyoxyalkylene chain, in which the silicone chain is contained on one terminal, only one type of the polymerizable monomers (2) may be used, or two or more types thereof may be used together.

In addition, in a case where the polymer described above is a copolymer of two or more types of polymerizable monomers (2), the polymerization form of the copolymer is not particularly limited, and may be a random copolymer of two or more types of polymerizable monomers (2) having structures different from each other, or may be a block copolymer of two or more types of polymerizable monomers (2) having structures different from each other.

In a case where the polymer of the invention is the polymer that contains the polymerizable monomer (2) having one or more selected from the alkyl group having 1 to 18 carbon atoms, the aromatic group having 6 to 18 carbon atoms, and the group containing a polyoxyalkylene chain as the polymeric component, and has a silicone chain on one terminal, the polymer of the invention may include a polymer part of a polymerizable monomer other than the polymerizable monomer (2).

The polymeric component, for example, may contain 90% by mass or more of the polymerizable monomer (2), and preferably contains 95% by mass or more of the polymerizable monomer (2), and more preferably contains only the polymerizable monomer (2). That is, the polymer of the invention is most preferably the polymer of the polymerizable monomer (2) having one or more selected from the alkyl group having 1 to 18 carbon atoms, the aromatic group having 6 to 18 carbon atoms, and the group containing a polyoxyalkylene chain, in which the silicone chain is contained on one terminal.

The polymer of the invention does not contain the polymerizable unsaturated group.

In a case where the polymer of the invention is preferably used as the leveling agent of the coating agent, and contains the polymerizable unsaturated group that may react with the base polymer or the like contained in the coating composition, a desired effect may be impaired.

Examples of the polymerizable unsaturated group described above include a carbon-carbon unsaturated double bond (C═C)-containing group such as a (meth)acryloyl group, a (meth)acryloyl oxy group, a (meth)acryloyl amide group, a vinyl ether group, an allyl group, a styryl group, and a maleimide group.

It is preferable that the polymer of the invention does not contain a reactive functional group.

In the invention, the "reactive functional group" is a functional group that is capable of forming a crosslinking structure or the like by reacting with other functional groups, and examples thereof include an isocyanate group, an epoxy group, a carboxyl group, a carboxylic acid halide group, a carboxylic acid anhydride group, and the like.

In a case where the polymer of the invention is preferably used as the leveling agent of the coating agent, and contains the reactive functional group that may react with the base polymer or the like contained in the coating composition, a desired effect may be impaired.

The number average molecular weight (Mn) of the polymer of the invention is preferably in a range of 1000 to 500000, more preferably in a range of 2000 to 100000, and even more preferably in a range of 2000 to 40000.

The weight average molecular weight (Mw) of the polymer of the invention is preferably in a range of 1000 to 500000, more preferably in a range of 2000 to 100000, and even more preferably in a range of 2000 to 40000.

The dispersion degree (Mw/Mn) of the polymer of the invention is preferably in a range of 1.0 to 2.0, more preferably in a range of 1.0 to 1.8, and even more preferably in a range of 1.0 to 1.5.

The value of the number average molecular weight (Mn) and the weight average molecular weight (Mw) of the polymer of the invention is measured by a method described in Examples.

[Production Method of Polymer]

In a reaction system containing a compound (1) having a functional group with radical generation ability on one terminal of the silicone chain having the number average molecular weight in a range of 2000 to 20000, and the polymerizable monomer (2), a radical is generated from the compound (1), and the polymerizable monomer (2) is subjected to living radical polymerization on the compound (1), and thus, the polymer of the invention can be produced.

Examples of the functional group with the radical generation ability of the compound (1) include an organic group having a halogen atom, an organic group having alkyl tellurium group, an organic group having a dithioester group, an organic group having a peroxide group, an organic group having an azo group, and the like.

As the functional group with the radical generation ability of the compound (1), the organic group having a halogen atom is preferable from the viewpoint of the ease of synthesis, the ease of polymerization control, and the diversity of an applicable polymerizable monomer.

Examples of the organic group having a halogen atom include organic groups including a 2-bromo-2-methyl propionyl oxy group, a 2-bromo-propionyl oxy group, a parachlorosulfonyl benzoyl oxy group, and the like.

The compound (1) having the functional group with the radical generation ability on one terminal of the silicone chain having the number average molecular weight in a range of 2000 to 20000 is preferably a compound represented by Formula (1-1) described below.

[Chem. 4]

(1-1)

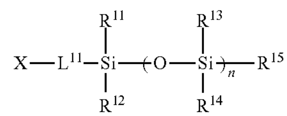

(In Formula (1-1) described above, $R^{11}$, $R^{12}$, $R^{13}$, $R^{14}$, and $R^{15}$ are each independently an alkyl group having 1 to 18 carbon atoms or a phenyl group, $L^{11}$ is a divalent organic group or a single bond, n is an integer, and X is a functional group with radical generation ability.)

In Formula (1-1) described above, the preferred aspects of $R^{11}$, $R^{12}$, $R^{13}$, $R^{14}$, $R^{15}$, $L^{11}$, and n are the same as the preferred aspects of $R^{11}$, $R^{12}$, $R^{13}$, $R^{14}$, $R^{15}$, $L^{11}$, and n in Formula (1) described above.

In Formula (1-1) described above, the functional group with the radical generation ability of X, for example, is a functional group having a halogen atom, and preferably a functional group represented by Formula (X-1) described below.

[Chem. 5]

(X-1)

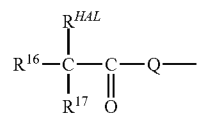

(In Formula (X-1) described above, $R^{HAL}$ is a halogen atom, $R^{16}$ and $R^{17}$ are each independently an alkyl group having 1 to 6 carbon atoms, and Q is an oxygen atom or a sulfur atom.)

Specific examples of the compound (1) having the functional group with the radical generation ability on one terminal of the silicone chain having the number average molecular weight in a range of 2000 to 20000 include compounds represented by Formulae (A-1) to (A-5) described below.

[Chem. 6]

(A-1)

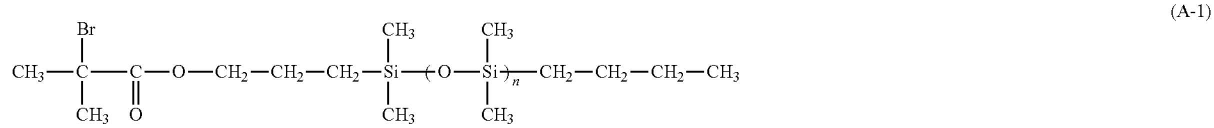

(A-2)

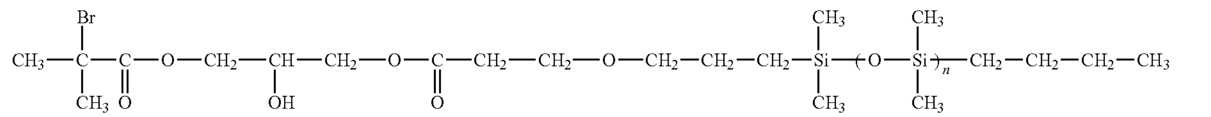

(A-3)

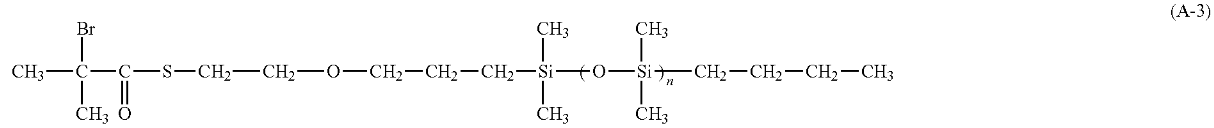

(A-4)

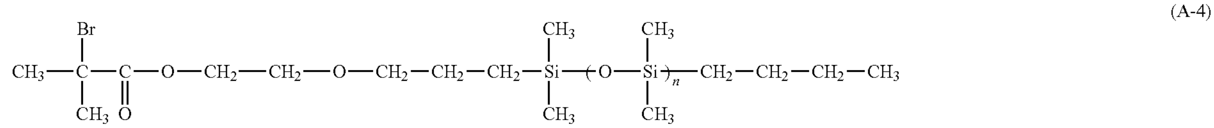

(A-5)

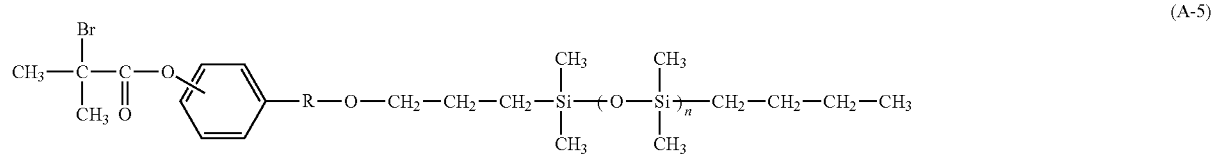

(In Formulae (A-1) to (A-5) described above, n is an integer, and preferably an integer of 27 to 270, and R is a divalent organic group or a single bond.)

The compound (1) having the functional group with the radical generation ability on one terminal of the silicone chain having the number average molecular weight in a range of 2000 to 20000 can be produced by a known method (for example, JP6405647B).

The polymerizable monomer (2) used in a production method of the polymer of the invention is the same as the polymerizable monomer (2) described in the polymer of the invention.

As the preparation ratio (the mass) of the compound (1) and the polymerizable monomer (2) at the time of producing the polymer of the invention, for example, the content ratio of the compound (1) to the entire reaction raw material may be in a range of 5 to 95% by mass, and for example, is Compound (1):Polymerizable Monomer (2)=5:95 to 95:5, preferably Compound (1):Polymerizable Monomer (2)=10:90 to 90:10, more preferably Compound (1):Polymerizable Monomer (2)=15:85 to 80:20, and even more preferably Compound (1):Polymerizable Monomer (2)=20:80 to 70:30, at a mass ratio.

In the living radical polymerization, a dormant species in which an active polymerization terminal is protected by an atom or an atom group reversibly generates a radical to react with a monomer such that a growth reaction progresses, and even in a case where a first monomer is consumed, a growth terminal does not lose the activity and reacts with a second monomer that is sequentially added, and thus, a block polymer can be obtained. Examples of the living radical polymerization include atom transfer radical polymerization (ATRP), reversible addition-fragmentation radical polymerization (RAFT), nitroxide-mediated radical polymerization (NMP), and organic tellurium-mediated radical polymerization (TERP). Among them, using which method is not particularly limited, and ATRP is preferable from the viewpoint of the ease of control and the like. In ATRP, polymerization is performed by using an organic halide, a halogenated sulfonyl compound, or the like as a polymerization initiator, and by using a metal complex containing a transition metal compound and a ligand as a catalyst.

In the production method of the polymer of the invention, the compound (1) is capable of functioning as the polymerization initiator, and thus, the polymerizable monomer (2) can be subjected to the living radical polymerization on the compound (1)

The transition metal compound that can be used in ATRP is represented by $M^{n+}X_n$.

The transition metal $M^{n+}$ of the transition metal compound represented by $M^{n+}X_n$ can be selected from the group consisting of $Cu^+$, $Cu^{2+}$, $Fe^{2+}$, $Fe^{3+}$, $Ru^{2+}$, $Ru^{3+}$, $Cr^{2+}$, $Cr^{3+}$, $Mo^0$, $Mo^+$, $Mo^{2+}$, $Mo^{3+}$, $W^{2+}$, $W^{3+}$, $Rh^{3+}$, $Rh^{4+}$, $Co^+$, $Co^{2+}$, $Re^{2+}$, $Re^{3+}$, $Ni^0$, $Ni^+$, $Mn^{3+}$, $Mn^{4+}$, $V^{2+}$, $V^{3+}$, $Zn^+$, $Zn^{2+}$, $Au^+$, $Au^{2+}$, $Ag^+$, and $Ag^{2+}$.

X of the transition metal compound represented by $M^{n+}X_n$ can be selected from the group consisting of a halogen atom, an alkoxyl group having 1 to 6 carbon atoms, $(SO_4)_{1/2}$, $(PO_4)_{1/3}$, $(HPO_4)_{1/2}$, $(H_2PO_4)$, triflate, hexafluorophosphate, methane sulfonate, aryl sulfonate (preferably benzene sulfonate or toluene sulfonate), $SeR^{11}$, CN, and $R^{12}COO$. Here, $R^{11}$ represents an aryl group, a linear or branched alkyl group having 1 to 20 carbon atoms (preferably 1 to 10 carbon atoms), and $R^{12}$ represents a hydrogen atom, a linear or branched alkyl group having 1 to 6 carbon atoms (preferably a methyl group) that may be substituted with halogen 1 to 5 times (preferably with fluorine or chlorine 1 to 3 times).

n of the transition metal compound represented by $M^{n+}X_n$ represents a formal charge on a metal, and is an integer of 0 to 7.

Examples of a ligand compound that can be coordinately bonded to the transition metal of the transition metal compound include a compound having a ligand containing one or more nitrogen atoms, oxygen atoms, phosphorus atoms, or sulfur atoms that can be coordinated with the transition metal through a σ bond, a compound having a ligand containing two or more carbon atoms that can be coordinated with the transition metal through a π bond, and a compound having a ligand that can be coordinated with the transition metal through a μ bond or η bond.

The transition metal complex is not particularly limited, and examples thereof include preferably transition metal complexes of Groups 7, 8, 9, 10, and 11, and more preferably a complex of zerovalent copper, monovalent copper, divalent ruthenium, divalent iron, or divalent nickel.

In a case where the central metal is copper, specific examples of the catalyst that can be used in ATRP include a complex with a ligand such as 2,2'-bipyridyl and a derivative thereof, 1,10-phenanthroline and a derivative thereof, and polyamine such as tetramethyl ethylene diamine, pentamethyl diethylene triamine, hexamethyl tris(2-aminoethyl) amine, tris[2-(dimethyl amino)ethyl] amine, and tris(2-pyridyl methyl) amine. In addition, examples of the divalent ruthenium complex include dichlorotris(triphenyl phosphine) ruthenium, dichlorotris(tributyl phosphine) ruthenium, dichloro(cyclooctadiene) ruthenium, dichlorobenzene ruthenium, dichlorop-cymene ruthenium, dichloro(norbornadiene) ruthenium, cis-dichlorobis(2,2'-bipyridine) ruthenium, dichlorotris(1,10-phenanthroline) ruthenium, and carbonyl chlorohydridotris(triphenyl phosphine) ruthenium. Further, examples of the divalent iron complex include a bistriphenyl phosphine complex and a triazacyclononane complex.

The atom transfer radical polymerization (ATRP) is not limited to the above, and ATRP other than the above can also be implemented. For example, AGET ATRP, ARGET ATRP, ICAR ATRP, and the like described in "Macromol. Rapid. Commun. 2018, 1800616" can also be adopted.

In the living radical polymerization, it is preferable to use a solvent.

Examples of the solvent that is used in the living radical polymerization include an ester-based solvent such as ethyl acetate, butyl acetate, and propylene glycol monomethyl ether acetate; an ether-based solvent such as diisopropyl ether, dimethoxyethane, and diethylene glycol dimethyl ether; a halogen-based solvent such as dichloromethane and dichloroethane; an aromatic-based solvent such as toluene, xylene, and anisole; a ketone-based solvent such as methyl ethyl ketone, methyl isobutyl ketone, and cyclohexanone; an alcohol-based solvent such as methanol, ethanol, and isopropanol; and a polar aprotic solvent such as dimethyl formamide and dimethyl sulfoxide.

Only one type of the solvents described above may be used, or two or more types thereof may be used together.

It is preferable that a polymerization temperature in the living radical polymerization is in a range of a room temperature to 120° C.

In a case where the polymer of the invention is produced by the living radical polymerization, the metal caused by the transition metal compound that is used in the polymerization may remain in the polymer to be obtained. The metal remaining in the polymer to be obtained may be removed by using active alumina or the like after the polymerization is completed.

[Coating Composition]

The polymer of the invention can be preferably used as the leveling agent of the coating composition, and the coating composition of the invention contains the polymer of the invention. The polymer of the invention can be a fluorine atom-free leveling agent not containing a fluorine atom, and thus, is a leveling agent with low accumulative properties on the environment and a low environmental load.

The content of the polymer of the invention in the coating composition of the invention is different in accordance with the type of base resin, an application method, a desired film thickness, or the like, and is preferably 0.0001 to 10 parts by mass, more preferably 0.001 to 5 parts by mass, and even more preferably 0.01 to 2 parts by mass, with respect to 100 parts by mass of the solid content of the coating composition. In a case where the content of the polymer of the invention is in the range described above, it is possible to sufficiently decrease a surface tension, to obtain desired leveling properties, and to suppress the occurrence of a defect such as foaming in application.

The usage of the coating composition of the invention is not particularly limited, and the coating composition can also be used in any usage as the leveling properties are demanded. The coating composition of the invention, for example, can be used as various coating material compositions or photosensitive resin compositions.

In a case where the coating composition of the invention is the coating material composition, examples of the coating material composition include a coating material using a natural resin, such as a petroleum resin coating material, a shellac coating material, a rosin-based coating material, a cellulose-based coating material, a rubber-based coating material, a Japanese lacquer coating material, a cashew resin coating material, and an oil-based vehicle coating material; and a coating material using a synthetic resin, such as a phenolic resin coating material, an alkyd resin coating material, a unsaturated polyester resin coating material, an amino resin coating material, an epoxy resin coating material, a vinyl resin coating material, an acrylic resin coating material, a polyurethane resin coating material, a silicone resin coating material, and a fluorine resin coating material.

By adding the polymer of the invention to the coating material composition, it is possible to impart smoothness to the coating film to be obtained.

A coloring agent such as a pigment, a dye, and carbon; an inorganic powder such as silica, titanium oxide, zinc oxide, aluminum oxide, zirconium oxide, calcium oxide, and calcium carbonate; an organic fine powder such as a higher fatty acid, a polyacrylic resin, and polyethylene; and various additives such as a light resistance improver, a weather resistance improver, a heat resistance improver, an antioxidant, a thickener, and an anti-settling agent can be suitably added to the coating material composition, as necessary.

As a coating method of the coating composition of the invention, any known coating method can also be used, and examples thereof include a method such as a slit coater, a slit & spin coater, a spin coater, a roll coater, electrostatic coating, a bar coater, a gravure coater, a die coater, a knife coater, ink jet, dipping coating, spray coating, shower coating, screen printing, gravure printing, offset printing, and reverse application.

The photosensitive resin composition is irradiated with light such as visible light or ultraviolet light, and thus, the physical properties of the resin, such as solubility, a viscosity, a transparency, a refractive index, a conductivity, and ion permeability, are changed.

In the photosensitive resin composition, a resist composition (a photoresist composition, a color resist composition for a color filter, and the like) is required to have advanced leveling properties. In general, the resist composition is applied onto a silicon wafer or a glass substrate deposited with various metals by spin coating such that the thickness is approximately 1 to 2 In this case, when the thickness of the coating film fluctuates or coating unevenness occurs, there is a problem that the linearity or the reproducibility of a pattern is degraded, and thus, it is not possible to obtain a resist pattern with a desired accuracy. In addition to such a problem, there are also various problems relevant to leveling such as a dropping trace, overall unevenness, and a bead phenomenon that the edge portion is thicker than the center portion.

In the coating composition of the invention, the polymer of the invention exhibits advanced leveling properties and is capable of forming a homogeneous coating film (cured material), and thus, in a case where the polymer is used as the resist composition, the problems described above can be solved.

In a case where the coating composition of the invention is the photoresist composition, the photoresist composition contains an alkali-soluble resin, a radiosensitive substance (a photosensitive substance), a solvent, and the like, in addition to the polymer of the invention.

The alkali-soluble resin contained in the photoresist composition is a resin soluble in an alkaline solution that is a developer used in the patternization of the resist.

Examples of the alkali-soluble resin include a novolak resin obtained by condensing an aromatic hydroxy compound derivative such as phenol, cresol, xylenol, resorcinol, phloroglucinol, and hydroquinone and an aldehyde compound such as formaldehyde, acetaldehyde, and benzaldehyde; a polymer or a copolymer of a vinyl phenol compound derivative such as o-vinyl phenol, m-vinyl phenol, p-vinyl phenol, and a-methyl vinyl phenol; a polymer or copolymer of a (meth)acrylic acid such as an acrylic acid, a methacrylic acid, and hydroxyethyl (meth)acrylate; polyvinyl alcohol; a modified resin in which a radiosensitive group such as a quinone diazide group, a naphthoquinone azide group, an aromatic azide group, and an aromatic cinnamoyl group is introduced through a part of hydroxyl groups of such various resins; and a urethane resin having an acidic group such as a carboxylic acid and a sulfonic acid in molecules.

Only one type of such alkali-soluble resins may be used, or two or more types thereof may be used together.

The radiosensitive substance contained in the photoresist composition is a substance that changes the solubility of the alkali-soluble resin with respect to the developer by being irradiated with an energy beam such as a ultraviolet ray, a far-ultraviolet ray, excimer laser light, an X-ray, an electron beam, an ion beam, a molecular beam, and a y-ray.

Examples of the radiosensitive substance include a quinone diazide-based compound, a diazo-based compound, an azide-based compound, an onium salt compound, a halogenated organic compound, a mixture of a halogenated organic compound and an organic metal compound, an organic acid ester compound, an organic acid amide compound, an organic acid imide compound, and a poly(olefin sulfone) compound Examples of the quinone diazide-based compound include 1,2-benzoquinone azide-4-sulfonic acid ester, 1,2-naphthoquinone diazide-4-sulfonic acid ester, 1,2-naphthoquinone diazide-5-sulfonic acid ester, 2,1-naphthoquinone diazide-4-sulfonic acid ester, 2,1-naphthoquinone diazide-5-sulfonic acid ester, and sulfonic acid chloride of a quinone diazide derivative, such as 1,2-benzoquinone azide-4-sulfonic acid chloride, 1,2-naphthoquinone diazide-4-sulfonic acid chloride, 1,2-naphthoquinone diazide-5-sulfonic acid chloride, 2,1-naphthoquinone diazide-4-sulfonic acid chloride, and 2,1-naphthoquinone diazide-5-sulfonic acid chloride.

Examples of the diazo-based compound include a salt of a condensate of p-diazodiphenyl amine and formaldehyde or acetaldehyde, a diazo resin inorganic salt that is a reaction product of a hexafluorophosphate, a tetrafluoroborate, a perchlorate, or a periodate and the condensate described above, and a diazo resin organic salt that is a reaction product of the condensate described above and sulfonic acids, as described in the specification of U.S. Pat. No. 3,300,309.

Examples of the azide-based compound include an azidochalconic acid, diazide benzal methyl cyclohexanones, azide cinnamylidene acetophenones, an aromatic azide compound, and an aromatic diazide compound.

Examples of the halogenated organic compound include a halogen-containing oxadiazole-based compound, a halogen-containing triazine-based compound, a halogen-containing acetophenone-based compound, a halogen-containing benzophenone-based compound, a halogen-containing sulfoxide-based compound, a halogen-containing sulfone-based compound, a halogen-containing thiazole-based compound, a halogen-containing oxazole-based compound, a halogen-containing triazole-based compound, a halogen-containing 2-pyrone-based compound, a halogen-containing aliphatic hydrocarbon-based compound, a halogen-containing aromatic hydrocarbon-based compound, a halogen-containing heterocyclic compound, and a sulfenyl halide-based compound.

In addition to the above, a compound used as a halogen-based flame retardant, such as tris(2,3-dibromopropyl) phosphate, tris(2,3-dibromo-3-chloropropyl) phosphate, chlorotetrabromomethane, hexachlorobenzene, hexabromobenzene, hexabromocyclododecane, hexabromobiphenyl, tribromophenyl allyl ether, tetrachlorobisphenol A, tetrabromobisphenol A, bis(bromoethyl ether) tetrabromobisphenol A, bis(chloroethyl ether) tetrachlorobisphenol A, tris(2,3-dibromopropyl) isocyanurate, 2,2-bis(4-hydroxy-3,5-dibromophenyl) propane, and 2,2-bis(4-hydroxyethoxy-3,5-dibromophenyl) propane, a compound used as an organic chloro-based pesticide, such as dichlorophenyl trichloroethane, and the like are also exemplified as the halogenated organic compound.

Examples of the organic acid ester include carboxylic acid ester and sulfonic acid ester. In addition, examples of the organic acid amide include carboxylic acid amide and sulfonic acid amide. Further, examples of the organic acid imide include carboxylic acid imide, and sulfonic acid imide.

Only one type of the radiosensitive substances may be used, or two or more types thereof may be used together.

In the photoresist composition, the content of the radiosensitive substance is preferably in a range of 10 to 200 parts by mass, and more preferably in a range of 50 to 150 parts by mass, with respect to 100 parts by mass of the alkali-soluble resin.

Examples of the solvent for the photoresist composition include ketones such as acetone, methyl ethyl ketone, cyclohexanone, cyclopentanone, cycloheptanone, 2-heptanone, methyl isobutyl ketone, and butyrolactone; alcohols such as methanol, ethanol, n-propyl alcohol, iso-propyl alcohol, n-butyl alcohol, iso-butyl alcohol, tert-butyl alcohol, pentanol, heptanol, octanol, nonanol, and decanol; ethers such as ethylene glycol dimethyl ether, ethylene glycol diethyl ether, and dioxane; alcohol ethers such as ethylene glycol monomethyl ether, ethylene glycol monoethyl ether, ethylene glycol monopropyl ether, propylene glycol monomethyl ether, propylene glycol monoethyl ether, and propylene glycol monopropyl ether; esters such as ethyl formate, propyl formate, butyl formate, methyl acetate, ethyl acetate, butyl acetate, propyl acetate, methyl propionate, ethyl propionate, propyl propionate, butyl propionate, methyl butyrate, ethyl butyrate, butyl butyrate, propyl butyrate, ethyl lactate, and butyl lactate; monocarboxylic acid esters such as methyl 2-oxypropionate, ethyl 2-oxypropionate, propyl 2-oxypropionate, butyl 2-oxypropionate, methyl 2-methoxypropionate, ethyl 2-methoxypropionate, propyl 2-methoxypropionate, and butyl 2-methoxypropionate; cellosolve esters such as cellosolve acetate, methyl cellosolve acetate, ethyl cellosolve acetate, propyl cellosolve acetate, and butyl cellosolve acetate; propylene glycols such as propylene glycol, propylene glycol monomethyl ether, propylene glycol monomethyl ether acetate, propylene glycol monoethyl ether acetate, and propylene glycol monobutyl ether acetate; diethylene glycols such as diethylene glycol monomethyl ether, diethylene glycol monoethyl ether, diethylene glycol dimethyl ether, diethylene glycol diethyl ether, and diethylene glycol methyl ethyl ether; halogenated hydrocarbons such as trichloroethylene, a freon solvent, HCFC, and HFC; fully fluorinated solvents such as perfluorooctane; aromatics such as toluene and xylene; and a polar solvent such as dimethyl acetamide, dimethyl formamide, N-methyl acetamide, and N-methyl pyrrolidone.

Only one type of such solvents may be used, or two or more types thereof may be used together.

In a case where the coating composition of the invention is the color resist composition, the color resist composition contains an alkali-soluble resin, a polymerizable compound, a coloring agent, and the like, in addition to the polymer of the invention.

As the alkali-soluble resin contained in the color resist, the same alkali-soluble resin as the alkali-soluble resin contained in the photoresist composition described above can be used.

The polymerizable compound contained in the color resist composition, for example, is a compound having a photopolymerizable functional group that can be subjected to polymerization or a crosslinking reaction by being irradiated with an active energy beam such as a ultraviolet ray.

Examples of the polymerizable compound described above include a unsaturated carboxylic acid such as a (meth)acrylic acid, ester of a monohydroxy compound and a unsaturated carboxylic acid, ester of an aliphatic polyhydroxy compound and a unsaturated carboxylic acid, ester of an aromatic polyhydroxy compound and a unsaturated carboxylic acid, ester obtained by an esterification reaction between a unsaturated carboxylic acid and a polyvalent hydroxy compound such as a polyvalent carboxylic acid, and the aliphatic polyhydroxy compound and the aromatic polyhydroxy compound described above, a polymerizable compound having a urethane skeleton obtained by a reaction between a polyisocyanate compound and a (meth)acryloyl group-containing hydroxy compound, and a polymerizable compound having an acid group.

Only one type of the polymerizable compounds may be used, or two or more types thereof may be used together.

Examples of the ester of the aliphatic polyhydroxy compound and the unsaturated carboxylic acid include (meth) acrylic acid ester such as ethylene glycol di(meth)acrylate, triethylene glycol di(meth)acrylate, trimethylol propane tri (meth)acrylate, trimethylol ethane tri(meth)acrylate, pentaerythritol di(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and glycerol (meth) acrylate.

In addition, examples of the ester of the aliphatic polyhydroxy compound and the unsaturated carboxylic acid also include itaconic acid ester in which the site of the (meth) acrylic acid of the acrylate is substituted with an itaconic acid, crotonic acid ester in which the site is substituted with a crotonic acid, and maleic acid ester in which the site is substituted with a maleic acid.

Examples of the ester of the aromatic polyhydroxy compound and the unsaturated carboxylic acid include hydroquinone di(meth)acrylate, resorcin di(meth)acrylate, and pyrogallol tri(meth)acrylate.

The ester obtained by the esterification reaction between the unsaturated carboxylic acid, the polyvalent carboxylic acid, and the polyvalent hydroxy compound may be a single substance, or may be a mixture. Examples of such ester include ester obtained from a (meth)acrylic acid, a phthalic acid, and ethylene glycol, ester obtained from a (meth) acrylic acid, a maleic acid, and diethylene glycol, ester obtained from a (meth)acrylic acid, a terephthalic acid, and pentaerythritol, and ester obtained from a (meth)acrylic acid, an adipic acid, butanediol, and glycerine.

Examples of the polymerizable compound having a urethane skeleton obtained by the reaction between the polyisocyanate compound and the (meth)acryloyl group-containing hydroxy compound include aliphatic diisocyanate such as hexamethylene diisocyanate and trimethyl hexamethylene diisocyanate; alicyclic diisocyanate such as cyclohexane diisocyanate and isophorone diisocyanate; and a reactant of aromatic diisocyanate such as tolylene diisocyanate and diphenyl methane diisocyanate and a hydroxy compound having a (meth)acryloyl group, such as 2-hydroxyethyl (meth)acrylate and 3-hydroxy[1,1,1-tri(meth)acryloyl oxymethyl] propane.

The polymerizable compound having an acid group, for example, is the ester of the aliphatic polyhydroxy compound and the unsaturated carboxylic acid, and is preferably a polyfunctional polymerizable compound in which a unreacted hydroxyl group of the aliphatic polyhydroxy compound reacts with a non-aromatic carboxylic acid anhydride to have an acid group. The aliphatic polyhydroxy compound used in the preparation of the polyfunctional polymerizable compound is preferably pentaerythritol or dipentaerythritol.

The acid value of the polyfunctional polymerizable compound is preferably in a range of 0.1 to 40, and more preferably in a range of 5 to 30, from the viewpoint of excellent developability, excellent curability, or the like. In a case where two or more types of the polyfunctional polymerizable compounds having an acid group are used together, and in a case where the polyfunctional polymerizable compound having an acid group and a polyfunctional polymerizable compound not having an acid group are used together, it is preferable that the acid value of the mixture of the polymerizable compounds is in the range described above.

Specific examples of the polymerizable compound having an acid group include a mixture containing dipentaerythritol hexaacrylate, dipentaerythritol pentaacrylate, and succinic acid ester of dipentaerythritol pentaacrylate as a main component, and the mixture is commercially available as Aronix TO-1382 (manufactured by TOAGOSEI CO., LTD.).

Examples of a polymerizable compound other than the above include (meth)acrylamide such as ethylene bis(meth) acrylamide; allyl ester such as diallyl phthalate; and a compound having a vinyl group, such as divinyl phthalate.

In the color resist composition, the content of the polymerizable compound is preferably in a range of 5 to 80% by mass, more preferably in a range of 10 to 70% by mass, and even more preferably in a range of 20 to 50% by mass, with respect to the total solid content of the color resist composition.

The coloring agent of the color resist composition is not particularly limited insofar as coloring can be performed, and for example, may be a pigment, or may be a dye.

As the pigment, either an organic pigment or an inorganic pigment can be used. As the organic pigment, each color pigment such as a red pigment, a green pigment, a blue pigment, a yellow pigment, a violet pigment, an orange pigment, and a brown pigment can be used. In addition, examples of a chemical structure of the organic pigment include an azo-based structure, a phthalocyanine-based structure, a quinacridone-based structure, a benzimidazolone-based structure, an isoindolinone-based structure, a dioxazine-based structure, an indanthrene-based structure, and a perylene-based structure. In addition, examples of the inorganic pigment include barium sulfate, lead sulfate, titanium oxide, yellow lead, bengala, and chromium oxide.

Note that, "C.I." described below indicates a color index.

Examples of the red pigment include C.I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, and 276. Among them, C.I. Pigment Red 48:1, 122, 168, 177, 202, 206, 207, 209, 224, 242, or 254 is preferable, and C.I. Pigment Red 177, 209, 224, or 254 is more preferable.

Examples of the green pigment include C.I. Pigment Green 1, 2, 4, 7, 8, 10, 13, 14, 15, 17, 18, 19, 26, 36, 45, 48, 50, 51, 54, 55, and 58. Among them, C.I. Pigment Green 7, 36, or 58 is preferable.

Examples of the blue pigment include C.I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, and 79. Among them, C.I. Pigment Blue 15, 15:1, 15:2, 15:3, 15:4, or 15:6 is preferable, and C.I. Pigment Blue 15:6 is more preferable.

Examples of the yellow pigment include C.I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, and 208. Among them, C.I. Pigment Yellow 83, 117, 129, 138, 139, 150, 154, 155, 180, or 185 is preferable, and C.I. Pigment Yellow 83, 138, 139, 150, or 180 is more preferable.

Examples of the violet pigment include C.I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, and 50. Among them, C.I. Pigment Violet 19 or 23 is preferable, and C.I. Pigment Violet 23 is more preferable.

Examples of the orange pigment include C.I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, and 79. Among them, C.I. Pigment Orange 38 or 71 is preferable.

Since pixels of three primary colors of a color filter used in a liquid crystal display device and an organic EL display device are red (R), green (G), and blue (B), respectively, the red pigment, the green pigment, and the blue pigment are used as a main component, and in order to improve color reproducibility, the organic pigments of colors such as yellow, violet, and orange may be used for color adjustment.

In order to improve the brightness of the color liquid crystal display device and the organic EL display device, the average particle diameter of the organic pigment is preferably 1 μm or less, more preferably 0.5 μm or less, and even more preferably 0.3 μm or less. It is preferable that the organic pigment is used by being subjected to a dispersion treatment to have such an average particle diameter.

The average primary particle diameter of the organic pigment is preferably 100 nm or less, more preferably 50 nm or less, even more preferably 40 nm or less, and particularly preferably in a range of 10 to 30 nm.

Note that, the average particle diameter of the organic pigment is measured by a dynamic light scattering particle size distribution meter, and for example, can be measured by a Nanotrac particle size distribution measurement device "UPA-EX150", "UPA-EX250", or the like, manufactured by Nikkiso Co., Ltd.

In a case where the color resist composition is used to form a black matrix (BM), the coloring agent is not particularly limited insofar as the color is black, and examples thereof include carbon black, lamp black, acetylene black, bone black, thermal black, channel black, furnace black, black lead, iron black, titanium black, and the like. Among them, the carbon black and the titanium black are preferable from the viewpoint of a shading rate and image properties.

In addition, a combination may be used in which two or more types of organic pigments are mixed, and a black color is obtained by the mixed color.

Examples of a commercially available product of the carbon black include MA7, MA8, MA11, MA100, MA100R, MA220, MA230, MA600, #5, #10, #20, #25, #30, #32, #33, #40, #44, #45, #47, #50, #52, #55, #650, #750, #850, #950, #960, #970, #980, #990, #1000, #2200, #2300, #2350, #2400, #2600, #3050, #3150, #3250, #3600, #3750, #3950, #4000, #4010, OIL7B, OIL9B, OIL11B, OIL30B, and OIL31B, manufactured by Mitsubishi Chemical Corporation, Printex3, Printex3OP, Printex30, Printex300P, Printex40, Printex45, Printex55, Printex60, Printex75, Printex80, Printex85, Printex90, Printex A, Printex L, Printex G, Printex P, Printex U, Printex V, PrintexG, SpecialBlack 550, SpecialBlack 350, SpecialBlack 250, SpecialBlack 100, SpecialBlack 6, SpecialBlack 5, SpecialBlack 4, Color Black FW1, Color Black FW2, Color Black FW2V, Color Black FW18, Color Black FW18, Color Black FW200, Color Black S160, Color Black S170, and the like, manufactured by Evonik Degussa Japan Co., Ltd., Monarch120, Monarch280, Monarch460, Monarch800, Monarch880, Monarch900, Monarch1000, Monarch1100, Monarch1300, Monarch1400, Monarch4630, REGAL99, REGAL99R, REGAL415, REGAL415R, REGAL250, REGAL250R, REGAL330, REGAL400R, REGAL55RO, REGAL660R, BLACK PEARLS480, PEARLS130, VUL- CAN XC72R, ELFTEX-8, and the like, manufactured by Cabot Japan Corporation, and RAVEN11, RAVEN14, RAVEN15, RAVEN16, RAVEN22RAVEN30, RAVEN35, RAVEN40, RAVEN410, RAVEN420, RAVEN450, RAVEN500, RAVEN780, RAVEN850, RAVEN890H, RAVEN1000, RAVEN1020, RAVEN1040, RAVEN1060U, RAVEN1080U, RAVEN1170, RAVEN1190U, RAVEN1250, RAVEN1500, RAVEN2000, RAVEN2500U, RAVEN3500, RAVEN5000, RAVEN5250, RAVEN5750, and RAVEN7000, manufactured by Columbian Carbon Co., Ltd.

Among the carbon blacks described above, carbon black covered with a resin is preferable as carbon black with a high optical density and a high surface resistivity that are required for the black matrix of the color filter.

Examples of a commercially available product of the titanium black include titanium black 10S, 12S, 13R, 13M, and 13M-C, manufactured by Mitsubishi Materials Corporation.

In the coloring agent when used to form the black matrix (BM), two or more types of organic pigments may be mixed, and a black color may be obtained by the mixed color, and examples thereof include a black pigment in which the pigments of three colors of red, green, and blue are mixed.

Examples of a color material that can be used by being mixed to prepare the black pigment include Victoria Pure Blue (C.I. 42595), Auramine O (C.I. 41000), Cationic Brilliant Flavine (Basic 13), Rhodamine 6GCP (C.I. 45160), Rhodamine B (C.I. 45170), Safranin OK70:100 (C.I. 50240), Erioglaucine X (C.I. 42080), No. 120/ Lionol Yellow (C.I. 21090), Lionol Yellow GRO (C.I. 21090), Symuler Fast Yellow 8GF (C.I. 21105), Benzidine Yellow 4T-564D (C.I. 21095), Symuler Fast Red 4015 (C.I. 12355), Lionol Red 7B4401 (C.I. 15850), Fastogen Blue TGR-L (C.I. 74160), Lionol Blue SM (C.I. 26150), Lionol Blue ES (C.I. Pigment Blue 15:6), Lionogen Red GD (C.I. Pigment Red 168), and Lionol Green 2YS (C.I. Pigment Green 36).

Examples of another color material that can be used by being mixed to prepare the black pigment include C.I. Yellow Pigment 20, 24, 86, 93, 109, 110, 117, 125, 137, 138, 147, 148, 153, 154, and 166, C.I. Orange Pigment 36, 43, 51, 55, 59, and 61, C.I. Red Pigment 9, 97, 122, 123, 149, 168, 177, 180, 192, 215, 216, 217, 220, 223, 224, 226, 227, 228, and 240, C.I. Violet Pigment 19, 23, 29, 30, 37, 40, and 50, C.I. Blue Pigment 15, 15:1, 15:4, 22, 60, and 64, C.I. Green Pigment 7, and C.I. Brown Pigment 23, 25, and 26.

In a case where the carbon black is used as the black pigment, the average primary particle diameter of the carbon black is preferably in a range of 0.01 to 0.08 μm, and more preferably in a range of 0.02 to 0.05 μm from the viewpoint of excellent developability.

The carbon black has a particle shape different from that of the organic pigment or the like, exists in a state referred to as a structure in which primary particles are fused with each other, and may form fine pores on the surface of the particles by a post-treatment. Therefore, in order to express the particle shape of the carbon black, in general, it is preferable that a DBP absorption amount (JIS K6221) and a specific surface area (JIS K6217) by a BET method are measured to be the index of the structure or the pore volume, in addition to the average particle diameter of the primary particles obtained by the same method as that of the organic pigment.

The absorption amount of dibutyl phthalate (hereinafter, abbreviated to "DBP") of the carbon black is preferably in a range of 40 to 100 $cm^3$/100 g, and more preferably in a range of 50 to 80 $cm^3$/100 g from the viewpoint of excellent dispersibility/developability. The specific surface area of the carbon black by the BET method is preferably in a range of 50 to 120 $m^2$/g, and more preferably in a range of 60 to 95 $m^2$/g from the viewpoint of excellent dispersion stability.

Examples of the dye as the coloring agent in the color resist composition include an azo-based dye, an anthraquinone-based dye, a phthalocyanine-based dye, a quinone imine-based dye, a quinoline-based dye, a nitro-based dye, a carbonyl-based dye, and a methine-based dye.

Examples of the azo-based dye include C.I. Acid Yellow 11, C.I. Acid Orange 7, C.I. Acid Red 37, C.I. Acid Red 180, C.I. Acid Blue 29, C.I. Direct Red 28, C.I. Direct Red 83, C.I. Direct Yellow 12, C.I. Direct Orange 26, C.I. Direct Green 28, C.I. Direct Green 59, C.I. Reactive Yellow 2, C.I. Reactive Red 17, C.I. Reactive Red 120, C.I. Reactive Black 5, C.I. Disperse Orange 5, C.I. Disperse Red 58, C.I. Disperse Blue 165, C.I. Basic Blue 41, C.I. Basic Red 18, C.I. Mordant Red 7, C.I. Mordant Yellow 5, and C.I. Mordant Black 7.

Examples of the anthraquinone-based dye include C.I. Vat Blue 4, C.I. Acid Blue 40, C.I. Acid Green 25, C.I. Reactive Blue 19, C.I. Reactive Blue 49, C.I. Disperse Red 60, C.I. Disperse Blue 56, and C.I. Disperse Blue 60.

Examples of the phthalocyanine-based dye include C.I. Pad Blue 5, examples of the quinone imine-based dye include C.I. Basic Blue 3, and C.I. Basic Blue 9, examples of the quinoline-based dye include C.I. Solvent Yellow 33, C.I. Acid Yellow 3, and C.I. Disperse Yellow 64, and examples of the nitro-based dye include C.I. Acid Yellow 1, C.I. Acid Orange 3, and C.I. Disperse Yellow 42.

It is preferable to use the pigment as the coloring agent of the color resist composition, from the viewpoint of excellent light resistance, excellent weather resistance, and excellent robustness of the coating film to be obtained, and in order to adjust the color, the dye may be used together with the pigment, as necessary.

In the color resist composition, the content of the coloring agent is preferably 1% by mass or more, more preferably in a range of 5 to 80% by mass, and even more preferably in a range of 5 to 70% by mass, with respect to the total solid content of the color resist composition In a case where the color resist composition is used to form each pixel of red (R), green (G), and blue (B) of the color filter, the content of the coloring agent in the color resist composition is preferably in a range of 5 to 60% by mass, and more preferably in a range of 10 to 50% by mass, with respect to the total solid content of the color resist composition.

In a case where the color resist composition is used to form the black matrix of the color filter, the content of the coloring agent in the color resist composition is preferably in a range of 20 to 80% by mass, and more preferably in a range of 30 to 70% by mass, with respect to the total solid content of the color resist composition.

In the color resist composition, in a case where the coloring agent is the pigment, it is preferable to use a pigment dispersion liquid prepared by dispersing the pigment in an organic solvent using a dispersant.

Examples of the dispersant include a surfactant; an intermediate or a derivative of the pigment; an intermediate or a derivative of the dye; and a resin type dispersant such as a polyamide-based resin, a polyurethane-based resin, a polyester-based resin, and an acrylic resin. Among them, a graft copolymer having a nitrogen atom, an acrylic block copolymer having a nitrogen atom, a urethane resin dispersant, and the like are preferable. Since such dispersants have a nitrogen atom, the nitrogen atom has affinity with respect to the surface of the pigment, and a site other than the nitrogen atom increases affinity with respect to a medium, and thus, the dispersion stability is improved.

Only one type of the dispersants may be used, or two or more types thereof may be used together.

Examples of a commercially available product of the dispersant include "EFKA" series ("EFKA 46" and the like) manufactured by BASF; "Disperbyk" series and "BYK" series ("BYK-160", "BYK-161", "BYK-2001", and the like) manufactured by Big Chemie Japan Co., Ltd.; "Solsperse" series manufactured by The Lubrizol Corporation; "KP" series manufactured by Shin-Etsu Chemical Co., Ltd., "Polyflow" series manufactured by KYOEISHA CHEMICAL Co., Ltd.; "DISPARLON" series manufactured by Kusumoto Chemicals, Ltd.; and "AJISPER" series ("AJISPER PB-814" and the like) manufactured by Ajinomoto Fine-Techno Co., Inc.

Examples of the organic solvent used when preparing the pigment dispersion liquid include an acetic acid ester-based solvent such as propylene glycol monomethyl ether acetate and propylene glycol monoethyl ether acetate; a propionate-based solvent such as ethoxypropionate; an aromatic-based solvent such as toluene, xylene, and methoxybenzene; an ether-based solvent such as butyl cellosolve, propylene glycol monomethyl ether, diethylene glycol ethyl ether, and diethylene glycol dimethyl ether; a ketone-based solvent such as methyl ethyl ketone, methyl isobutyl ketone, and cyclohexanone; an aliphatic hydrocarbon-based solvent such as hexane; a nitrogen compound-based solvent such as N,N-dimethyl formamide, γ-butyrolactam, and N-methyl-2-pyrrolidone; a lactone-based solvent such as γ-butyrolactone; and carbamic acid ester.

Only one type of such solvents may be used, or two or more types thereof may be used together.

Examples of a preparation method of the pigment dispersion liquid include a method including a kneading dispersion step and a fine dispersion step of a coloring agent, and a method only including a fine dispersion step. In the kneading dispersion step, the coloring agent, a part of the alkali-soluble resin, and as necessary, the dispersant are mixed and kneaded. By performing the dispersion while imparting a strong shear force by using a kneader, it is possible to disperse the coloring agent.

Examples of a machine used in the kneading include a double roll, a triple roll, a ball mill, a tron mill, a disper, a kneader, a co-kneader, a homogenizer, a blender, and a monoaxial or biaxial extruder.

It is preferable to make the particle size of the coloring agent fine by a salt milling method or the like before the kneading described above is performed.

In the fine dispersion step, a solvent is added to a composition containing the coloring agent obtained in the kneading dispersion step, or the coloring agent, the alkali-soluble resin, the solvent, and as necessary, the dispersant are mixed, and are mixed and dispersed by using a disperser together with media for dispersing fine particles of glass, zirconia, or ceramics, and thus, it is possible to disperse the particles of the coloring agent to a fine state close to the primary particles.

The average particle diameter of the primary particles of the coloring agent is preferably 10 to 100 nm, and more preferably 10 to 60 nm, from the viewpoint of improving the transmittance, the contrast, or the like of the color filter. Note that, the average particle diameter of the coloring agent is measured by a dynamic light scattering particle size distribution meter, and for example, can be measured by a Nanotrac particle size distribution measurement device "UPA-EX150", "UPA-EX250", or the like, manufactured by Nikkiso Co., Ltd.

As described above, the coating material composition, the photoresist composition, and the color resist composition have been exemplified as the coating composition, but the coating composition is not limited thereto.

Specific examples of the usage of the coating composition of the invention include an anti-glare (AG) hard coat material, an anti-reflection (LR) coat material, a low-refractive index layer coat material, a high-refractive index layer coat material, a clear hard coat material, and a polymerizable liquid crystal coat material, which are coat materials for various display screens such as a liquid crystal display (hereinafter, abbreviated to "LCD"), a plasma display (hereinafter, abbreviated to "PDP"), an organic EL display (hereinafter, abbreviated to "OLED"), and a quantum dot display (hereinafter, abbreviated to "QDD"); a color resist, an ink jet ink, a printing ink, or a coating material for forming each pixel of RGB of a color filter (hereinafter, abbreviated to "CF") of LCD or the like; a black resist, an ink jet ink, a printing ink, or a coating material for forming a black matrix, a black column spacer, and a black photospacer of CF of LCD or the like; a coating material for a transparent protective film for protecting the surface of CF used in CF of LCD; a liquid crystal material, and a resin composition for a column spacer and a photospacer of LCD; a resin composition for a pixel partition, a positive photoresist for forming an electrode, a protective film, an insulating film, a plastic housing, a coating material for a plastic housing, and a bezel (frame) ink of LCD, PDP, OLED, QDD, or the like; a prism sheet and a light diffusion film, which are a backlight member of LCD; a coating material for an organic insulating film of a liquid crystal TFT array of LCD; an internal polarizer surface protective coat material of LCD; a fluorescent body of PDP; an organic EL material and a sealing material (a protective film and a gas barrier) of OLED; a quantum dot ink, a sealing material, and a protective film of QDD; a high-refractive index lens, low-refractive index sealing, and a LED pixel of a micro(mini)-LED display; a positive photoresist, a chemically amplified photoresist, an anti-reflective film, a multi-layer material (SOC and SOG), an underlayer film, buffer coat, a chemical liquid such as a developer, a rinsing liquid, a pattern collapse inhibitor, a polymer residue remover, and a cleaning agent, and a nanoimprint release agent, which are used for producing a semiconductor; a resin composition (a resin composition such as an epoxy resin, a phenolic resin, a polyphenylene ether resin, a liquid crystal polymer, a polyimide resin, a bismaleimide resin, a bisallyl nadimide resin, and a benzoxazine resin), a copper clad laminate, a copper foil with a resin, a build-up film, a passivation film, an interlayer insulating film, a flexible copper clad laminate, and a dry film resist for a semiconductor post-step or a printed wiring board; a color resist for an image sensor; a liquid repellent agent for solder flux; a dispersant, a coating material, and a green sheet for a laminated ceramic condenser; a cathode material, an anode material, a separator, and an electrolyte for a lithium ion battery; an exterior coating material, rubber, an elastomer, glass, deposition material anchor coat, a head lamp lens, a solid lubrication coating material, a heat dissipation substrate, an interior coating material, and a repair coating material for an automobile; wallpaper, a flooring material, a kitchen member, and a bathroom/toilet member for housing equipment; an ink jet ink for a printed matter, an offset printing ink, a gravure printing ink, a screen printing ink, a photoresist for a printing plate production step, a photosensitive material for a lithographic printing plate (PS plate), a package adhesive, and a ballpoint pen ink; a primer for easy adhesion of a plastic film; a water repellent for a fiber; an anti-diffusion agent for grease; a cleaning liquid for cleaning the surface of various products or parts; a hard coat material for an optical recording medium such as CD, DVD, or a Blu-ray disk; a housing for a smart phone or a mobile phone, or a coating material or a hard coat material for a screen; a hard coat material for a transfer film for an insert mold (IMD and IMF); a release film; a coating material or a coat material for various plastic molded articles such as the housing of home appliances; a printing ink or a coating material for various building materials such as a decorative plate; a coat material for a window glass of a house; a woodworking coating material such as furniture; a coat material for artificial/synthetic leather; a coat material for a rubber roller for an OA equipment such as a copier and a printer; a coat material for glass of a reading unit of an OA equipment such as a copier and a scanner; an optical lens of a camera, a video camera, glasses, and contact lenses, or a coat material thereof; the windshield of a watch such as a wristwatch, and a glass coat material; a window coat material of various vehicles such as an automobile and a railroad car; a coating material for an anti-reflective film of a cover glass or film for a solar cell; a coating material or a coat material for a FRP bath; PCM for a metallic building material or for producing home appliances; and a single layer or multi-layer coating composition of a photofabrication step or the like.

Since the polymer of the invention has excellent surface tension decrease ability, not only the leveling properties but also each function such as wettability, permeability, cleanliness, water repellency, oil repellency, antifouling properties, lubricity, blocking preventibility, and releasability can be expected. In addition, in a case where the polymer of the invention is mixed with a coating material or a coating agent containing fine particles, the dispersibility of the fine particles can be improved, and not only the leveling properties, but also the function as the dispersant of the fine particles can be expected. In addition, the polymer of the invention is added to a pressure-sensitive adhesive composition used in a pressure-sensitive adhesive tape or the like, in addition to the coating composition described above, and thus, not only the leveling properties but also each function such as the reduction of a peeling force, the suppression of a fluctuation in the peeling force, and the suppression of peeling electrification can be expected.

EXAMPLES

Hereinafter, the invention will be described in detail by Examples and Comparative Examples.

Note that, the invention is not limited to Examples described below.

In Examples and Comparative Examples, a weight average molecular weight (Mw) and a number average molecular weight (Mn) are a value in terms of polystyrene, on the basis of gel permeation chromatography (GPC) measurement.

A measurement condition of GPC is as follows.

[GPC Measurement Condition]

Measurement Device: High-Speed GPC Device "HLC-8420GPC", manufactured by TOSOH CORPORATION Column: "TSK GUARDCOLUMN SuperHZ-L" manufactured by TOSOH CORPORATION+"TSK gel SuperHZM-N" manufactured by TOSOH CORPORATION+"TSK gel SuperHZM-N" manufactured by TOSOH CORPORATION+"TSK gel SuperHZM-N" manufactured by TOSOH CORPORATION+"TSK gel SuperHZM-N" manufactured by TOSOH CORPORATION Detector: RI (Differential Refractometer)

Data Processing: "EcoSEC Data Analysis Version 1.07" manufactured by TOSOH CORPORATION Column Temperature: 40° C.

Developing Solvent: Tetrahydrofuran

Flow Velocity: 0.35 mL/minute

Measurement Sample: 7.5 mg of a sample was dissolved in 10 mL of tetrahydrofuran, and the obtained solution was filtered with a microfilter to be a measurement sample.

Sample Injection Amount: 20 μL

Standard Sample: The following monodispersed polystyrene having a known molecular weight was used on the basis of a measurement manual of "HLC-8420GPC" described above.

(Monodispersed Polystyrene)

"A-300" manufactured by TOSOH CORPORATION
"A-500" manufactured by TOSOH CORPORATION
"A-1000" manufactured by TOSOH CORPORATION
"A-2500" manufactured by TOSOH CORPORATION
"A-5000" manufactured by TOSOH CORPORATION
"F-1" manufactured by TOSOH CORPORATION
"F-2" manufactured by TOSOH CORPORATION
"F-4" manufactured by TOSOH CORPORATION
"F-10" manufactured by TOSOH CORPORATION
"F-20" manufactured by TOSOH CORPORATION
"F-40" manufactured by TOSOH CORPORATION
"F-80" manufactured by TOSOH CORPORATION
"F-128" manufactured by TOSOH CORPORATION
"F-288" manufactured by TOSOH CORPORATION

Example 1: Synthesis of Polymer (1) Having Silicone Chain on One Terminal of Polymer Main Chain 136.76 g of n-heptane as a solvent, 300.00 g of a silicone compound having a hydroxyl group on one terminal, represented by Formula (a-1) described below, and 10.48 g of triethyl amine as a catalyst were fed to a glass flask provided with a stirrer, a thermometer, a cooling tube, and a dropper, and were stirred for 30 minutes while retaining the temperature in the flask at 5° C.

[Chem. 7]

(a-1)

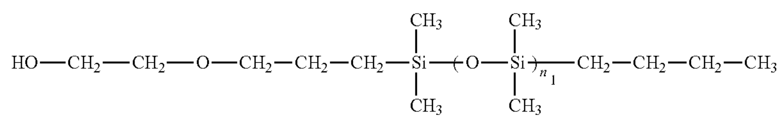

(In the formula, $n_1$ is 65 on average, and the molecular weight (Mn) of the silicone chain is 5000.)

19.10 g of 2-bromoisobutyric acid bromide was fed to the mixed liquid described above, and was stirred at a room temperature for 3 hours. After that, 341.89 g of n-heptane and 600 g of 0.36% hydrochloric acid were mixed and stirred, and then, were left to stand, and a hydrochloric acid layer was separated and taken out. After that, 600 g of an aqueous solution of saturated sodium hydrogen carbonate was mixed and stirred, and then, was left to stand, and an aqueous solution layer of the saturated sodium hydrogen carbonate was separated and taken out, and 600 g of ion exchange water was further mixed and stirred, and then, was left to stand, and an ion exchange water layer was separated and taken out.

Next, 8 g of magnesium sulfate as a dehydrating agent was added, and was shaken and mixed such that dehydration was performed, and then, the dehydrating agent was filtered. After that, the solvent was distilled and removed under reduced pressure, and the obtained residue was dissolved in 313.31 g of isopropyl ether. 300 g of 0.36% hydrochloric acid was mixed and stirred, and then, was left to stand, and a hydrochloric acid layer was separated and taken out. After that, 300 g of an aqueous solution of 1% sodium hydroxide was mixed and stirred, and then, was left to stand, an aqueous solution layer of the 1% sodium hydroxide was separated and taken out, and 300 g of ion exchange water was further mixed and stirred, and then, was left to stand, and an ion exchange water layer was separated and taken out. Next, 8 g of magnesium sulfate as a dehydrating agent was added, and was shaken and mixed such that dehydration was performed, and then, the dehydrating agent was filtered. After that, the solvent was distilled and removed under reduced pressure, and thus, a compound represented by Formula (A-4) described below was obtained.

[Chem. 8]

(A-4)

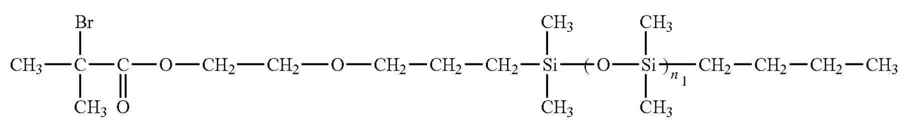

37.8 g of poly1,2-butylene glycol mono(meth)acrylate (the average number of repetitions of 1,2-butylene glycol is 6) and 79.0 g of methyl ethyl ketone as a solvent were fed to a nitrogen-substituted flask, and the temperature was increased to 50° C. while stirring in a nitrogen gas stream. Next, as a catalyst, 4.2 g of 2,2'-bipyridyl and 1.5 g of cuprous chloride were fed to the flask, and were stirred for 30 minutes while retaining the temperature in the flask at 50° C. After that, 12.3 g of the compound represented by Formula (A-4) described above as a polymerization initiator was added, and living polymerization was performed at 50° C. for 8 hours in a nitrogen gas stream.

30 g of active alumina was added to the obtained reactant, and was stirred. After the active alumina was filtered, the solvent was distilled and removed under reduced pressure, and thus, a polymer (1) having a silicone chain on one terminal of a polymer main chain was obtained.

As a result of measuring the molecular weight of the obtained polymer (1) with GPC, a weight average molecular weight (Mw) was 25000, a number average molecular weight (Mn) was 23000, and (Mw/Mn) was 1.1.

In addition, the ratio of the silicone chain in the polymer (1) was 24% by mass.

Example 2: Synthesis of Polymer (2) Having Silicone Chain on One Terminal of Polymer Main Chain 32.8 g of polypropylene glycol monomethacrylate (the average number of repetitions of propylene glycol is 4 to 6) and 79.0 g of methyl ethyl ketone as a solvent were fed to a nitrogen-substituted flask, and the temperature was increased to 50° C. while stirring in a nitrogen gas stream. Next, as a catalyst, 4.2 g of 2,2'-bipyridyl and 1.5 g of cuprous chloride were fed to the flask, and were stirred for 30 minutes while retaining the temperature in the flask at 50° C. After that, 17.2 g of the compound represented by Formula (A-4) described above as a polymerization initiator was added, and living polymerization was performed at 50° C. for 8 hours in a nitrogen gas stream.

30 g of active alumina was added to the obtained reactant, and was stirred. After the active alumina was filtered, the solvent was distilled and removed under reduced pressure, and thus, a polymer (2) having a silicone chain on one terminal of a polymer main chain was obtained.

As a result of measuring the molecular weight of the obtained polymer (2) with GPC, a weight average molecular weight (Mw) was 16000, a number average molecular weight (Mn) was 14000, and (Mw/Mn) was 1.1.

In addition, the ratio of the silicone chain in the polymer (2) was 32% by mass.

Example 3: Synthesis of Polymer (3) Having Silicone Chain on One Terminal 32.8 g of poly1,2-butylene glycol mono(meth)acrylate (the average number of repetitions of 1,2-butylene glycol is 6) and 79.0 g of methyl ethyl ketone as a solvent were fed to a nitrogen-substituted flask, and the temperature was increased to 50° C. while stirring in a nitrogen gas stream. Next, as a catalyst, 4.2 g of 2,2'-bipyridyl and 1.5 g of cuprous chloride were fed to the flask, and were stirred for 30 minutes while retaining the temperature in the flask at 50° C. After that, 17.2 g of the compound represented by Formula (A-4) described above as a polymerization initiator was added, and living polymerization was performed at 50° C. for 8 hours in a nitrogen gas stream.

30 g of active alumina was added to the obtained reactant, and was stirred. After the active alumina was filtered, the solvent was distilled and removed under reduced pressure, and thus, a polymer (3) having a silicone chain on one terminal of a polymer main chain was obtained.

As a result of measuring the molecular weight of the obtained polymer (3) with GPC, a weight average molecular weight (Mw) was 16000, a number average molecular weight (Mn) was 13000, and (Mw/Mn) was 1.2.

In addition, the ratio of the silicone chain in the polymer (3) was 32% by mass.

Example 4: Synthesis of Polymer (4) Having Silicone Chain on One Terminal 19.1 g of poly1,2-butylene glycol mono(meth)acrylate (the average number of repetitions of 1,2-butylene glycol is 6) and 79.0 g of methyl ethyl ketone as a solvent were fed to a nitrogen-substituted flask, and the temperature was increased to 50° C. while stirring in a nitrogen gas stream. Next, as a catalyst, 4.2 g of 2,2'-bipyridyl and 1.5 g of cuprous chloride were fed to the flask, and were stirred for 30 minutes while retaining the temperature in the flask at 50° C. After that, 31.0 g of the compound represented by Formula (A-4) described above as a polymerization initiator was added, and living polymerization was performed at 50° C. for 8 hours in a nitrogen gas stream.

30 g of active alumina was added to the obtained reactant, and was stirred. After the active alumina was filtered, the solvent was distilled and removed under reduced pressure, and thus, a polymer (4) having a silicone chain on one terminal of a polymer main chain was obtained.

As a result of measuring the molecular weight of the obtained polymer (4) with GPC, a weight average molecular weight (Mw) was 11000, a number average molecular weight (Mn) was 10000, and (Mw/Mn) was 1.1.

In addition, the ratio of the silicone chain in the polymer (4) was 58% by mass.

Example 5: Synthesis of Polymer (5) Having Silicone Chain on One Terminal 136.76 g of n-heptane as a solvent, 300.00 g of a silicone compound having a hydroxyl group on one terminal, represented by Formula (a-2) described below, and 10.48 g of triethyl amine as a catalyst were fed to a glass flask provided with a stirrer, a thermometer, a cooling tube, and a dropper, and were stirred for 30 minutes while retaining the temperature in the flask at 5° C.

[Chem. 9]

(a-2)

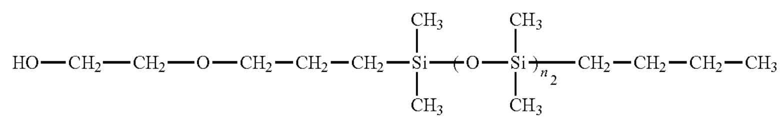

(In the formula, $n_2$ is 132 on average, and the molecular weight (Mn) of the silicone chain is 10000.)

19.10 g of 2-bromoisobutyric acid bromide was fed to the mixed liquid described above, and was stirred at a room temperature for 3 hours. After that, 341.89 g of n-heptane and 600 g of 0.36% hydrochloric acid were mixed and stirred, and then, were left to stand, and a hydrochloric acid layer was separated and taken out. After that, 600 g of an aqueous solution of saturated sodium hydrogen carbonate was mixed and stirred, and then, was left to stand, and an aqueous solution layer of the saturated sodium hydrogen carbonate was separated and taken out, and 600 g of ion exchange water was further mixed and stirred, and then, was left to stand, and an ion exchange water layer was separated and taken out.

Next, 8 g of magnesium sulfate as a dehydrating agent was added, and was shaken and mixed such that dehydration was performed, and then, the dehydrating agent was filtered. After that, the solvent was distilled and removed under reduced pressure, and the obtained residue was dissolved in 313.31 g of isopropyl ether. 300 g of 0.36% hydrochloric acid was mixed and stirred, and then, was left to stand, and a hydrochloric acid layer was separated and taken out. After that, 300 g of an aqueous solution of 1% sodium hydroxide was mixed and stirred, and then, was left to stand, and an aqueous solution layer of the 1% sodium hydroxide was separated and taken out, and 300 g of ion exchange water was further mixed and stirred, and was left to stand, and an ion exchange water layer was separated and taken out. Next, 8 g of magnesium sulfate as a dehydrating agent was added, and was shaken and mixed such that dehydration was performed, and then, the dehydrating agent was filtered. After that, the solvent was distilled and removed under reduced pressure, and thus, a compound represented by Formula (A-5) described below was obtained.

[Chem. 10]

(A-5)

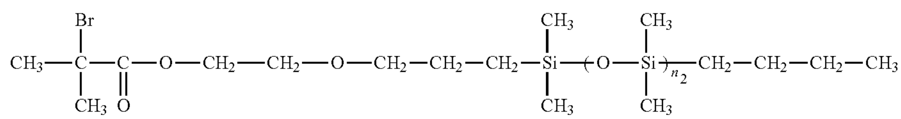

21.7 g of poly1,2-butylene glycol mono(meth)acrylate (the average number of repetitions of 1,2-butylene glycol is 6) and 61.5 g of methyl ethyl ketone as a solvent were fed to a nitrogen-substituted flask, and the temperature was increased to 60° C. while stirring in a nitrogen gas stream. Next, as a catalyst, 0.62 g of 2,2'-bipyridyl and 0.2 g of cuprous chloride were fed to the flask, and were stirred for 30 minutes while retaining the temperature in the flask at 60° C. After that, 20.0 g of the compound represented by Formula (A-5) described above as a polymerization initiator was added, and living polymerization was performed at 60° C. for 18 hours in a nitrogen gas stream.

30 g of active alumina was added to the obtained reactant, and was stirred. After the active alumina was filtered, the solvent was distilled and removed under reduced pressure, and thus, a polymer (5) having a silicone chain on one terminal of a polymer main chain was obtained.

As a result of measuring the molecular weight of the obtained polymer (5) with GPC, a weight average molecular weight (Mw) was 22000, a number average molecular weight (Mn) was 20000, and (Mw/Mn) was 1.1.

In addition, the ratio of the silicone chain in the polymer (5) was 47% by mass.

Comparative Example 1: Synthesis of Free Radical Copolymer (1') Using Silicone Monomer 200.0 g of butyl acetate as a solvent was fed to a nitrogen-substituted flask, and the temperature was increased to 90° C. while stirring in a nitrogen gas stream. Next, a monomer polymerization initiator solution in which 63.2 g of a polymerizable unsaturated monomer having a silicone chain represented by Formula (A') described below, 136.8 g of poly1,2-butylene glycol mono(meth)acrylate (the average number of repetitions of 1,2-butylene glycol is 6), and 3.0 g of t-butyl peroxy-2-ethyl hexanoate that is a polymerization initiator were dissolved in 266.0 g of butyl acetate was set in a dropper, and dropping was performed for 2 hours while retaining the temperature in the flask at 90° C. After the dropping was completed, a reaction was caused at 90° C. for 6 hours in a nitrogen gas stream, and thus, a random copolymer (1') was obtained.

The random copolymer (1') is a polymer having a plurality of silicone chains in a polymer chain.

[Chem. 11]

(A')

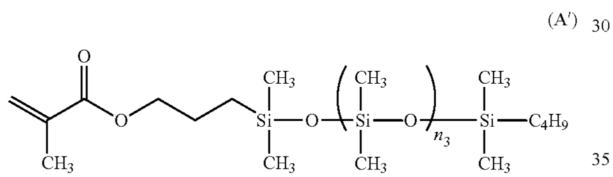

(In the formula, $n_3$ is 65 on number average, and the molecular weight (Mn) of the silicone chain is 5000.)

As a result of measuring the molecular weight of the obtained random copolymer (1') with GPC, a weight average molecular weight (Mw) was 14000, a number average molecular weight (Mn) was 1700, and (Mw/Mn) was 7.8.

In addition, the ratio of the silicone chain in the random copolymer (1') was 31% by mass.

Comparative Example 2: Synthesis of Free Radical Copolymer (2') Using Silicone Monomer 200.0 g of butyl acetate as a solvent was fed to a nitrogen-substituted flask, and the temperature was increased to 90° C. while stirring in a nitrogen gas stream. Next, a monomer polymerization initiator solution in which 63.2 g of the polymerizable unsaturated monomer having a silicone chain represented by Formula (A') described above, 136.8 g of poly1,2-butylene glycol mono(meth)acrylate (the average number of repetitions of 1,2-butylene glycol is 6), and 3.0 g of t-butyl peroxy-2-ethyl hexanoate that is a polymerization initiator were dissolved in 100.0 g of butyl acetate was set in a dropper, and dropping was performed for 2 hours while retaining the temperature in the flask at 90° C. After the dropping was completed, a reaction was caused at 90° C. for 6 hours in a nitrogen gas stream, and thus, a random copolymer (2') was obtained.

As a result of measuring the molecular weight of the obtained random copolymer (2') with GPC, a weight average molecular weight (Mw) was 34000, a number average molecular weight (Mn) was 3400, and (Mw/Mn) was 9.9.

In addition, the ratio of the silicone chain in the random copolymer (2') was 31% by mass.

The following evaluation was performed by using the polymer (1) produced in Example 1. The results are shown in Table 1.

In Table 1, a "Si chain" indicates a "silicone chain".

(Film Formation and Evaluation of Coating Film)

3.0 g of a resin solution (ACRYDIC ZL-295, manufactured by DIC CORPORATION) containing 40% by mass of an alkali-soluble resin, 1.2 g of Aronix M-402 (manufactured by TOAGOSEI CO., LTD., a mixture of dipentaerythritol pentaacrylate and dipentaerythritol hexaacrylate), 0.001 g of the polymer (1) in terms of a solid content, and 3.8 g of propylene glycol monomethyl ether acetate (PGMEA) were mixed to prepare a resist composition.

3 ml of the obtained resist composition was dropped to the central portion of a chromium-plated glass substrate of 10 cm×10 cm, spin coating was performed in the condition of a rotation number of 1000 rpm and a rotation time for 10 seconds, and then, heating and drying was performed at 100° C. for 100 seconds to produce a laminate including a coating film layer.

The smoothness of the coating film layer of the produced laminate and a defect on the coating film were evaluated by the following methods. The results are shown in Table 1.

(Smoothness)

The coating film layer of the obtained laminate was visually observed, and the smoothness of the coating film layer was evaluated in accordance with the following criteria.

AA: The unevenness of the coating film is not observed.
A: The unevenness of the coating film is hardly observed.
C: The unevenness of the coating film is observed on the entire film.

(Defect on Coating Film)

The coating film layer of the obtained laminate was visually observed, and a defect on the coating film of the coating film layer was also evaluated in accordance with the following criteria.

A: A defect on the coating film is hardly observed.
B: Several defects on the coating film are observed.
C: A number of defects on the coating film are observed.

The same evaluation as that in Example 1 was performed, except that the respective polymers produced in Examples 2 to 5 and Comparative Examples 1 and 2 were used instead of polymer (1). The results are shown in Table 1.

TABLE 1

| | Example 1 | Example 2 | Example 3 | Example 4 | Example 5 | Comparative Example 1 | Comparative Example 2 |
|---|---|---|---|---|---|---|---|
| Leveling Agent | Polymer (1) Having Silicone Chain on One Terminal (One Si Chain) | Polymer (2) Having Silicone Chain on One Terminal (One Si Chain) | Polymer (3) Having Silicone Chain on One Terminal (One Si Chain) | Polymer (4) Having Silicone Chain on One Terminal (One Si Chain) | Polymer (5) Having Silicone Chain on One Terminal (One Si Chain) | Random Copolymer (1') (Plurality of Si Chains) | Random Copolymer (2') (Plurality of Si Chains) |

TABLE 1-continued

| | Example 1 | Example 2 | Example 3 | Example 4 | Example 5 | Comparative Example 1 | Comparative Example 2 |
|---|---|---|---|---|---|---|---|
| Molecular Weight of Si Chain [Mn] | 5000 | 5000 | 5000 | 5000 | 10000 | 5000 | 5000 |
| Ratio of Si Chain [% by mass] | 24 | 32 | 32 | 58 | 47 | 31 | 31 |
| Smoothness of Coating Film | A | A | A | AA | A | A | A |
| Defect on Coating Film | A | A | A | A | A | C | C |

As seen from Table 1, it was found that in the case of using the polymer having a silicone chain only on the terminal (the polymers (1) to (5)) as a leveling agent, excellent smoothness was obtained, and a defect hardly occurred on the coating film. On the other hand, it was found that in the case of the polymer having a plurality of silicone chains in Comparative Examples 1 and 2 (the random copolymers (1') and (2')), the content of the silicone chain was approximately the same as that of the polymer (1) in Example 1, but a number of defects occurred on the coating film.

The invention claimed is:

1. A coating composition containing a silicone chain-containing polymer, wherein the silicone chain-containing polymer is a polymer that has a single silicone chain only on one terminal and does not contain a polymerizable unsaturated group, and contains one or more types of polymerizable monomers (2) selected from the group consisting of a compound represented by Formula (2-1) described below, a compound represented by Formula (2-2) described below, a compound represented by Formula (2-3) described below, and a compound represented by Formula (2-4) described below as a polymeric component, the silicone chain has a number average molecular weight in a range of 2000 to 20000, and wherein the single silicone chain is the only silicone chain in the silicone chain-containing polymer, and wherein the content of the silicone chain-containing polymer is 0.0001 to 10 parts by mass, with respect to 100 parts by mass of the solid content of the coating composition, (2-1)

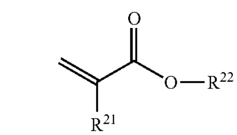

(2-2)

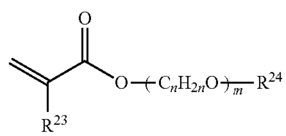

-continued (2-3)

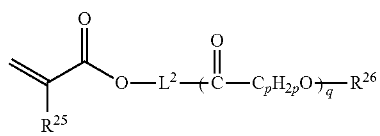

(2-4)

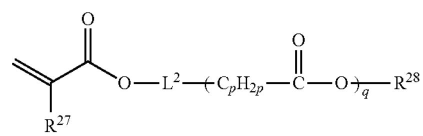

in Formulae (2-1), (2-2), (2-3), and (2-4) described above, $R^{21}$ is a hydrogen atom or a methyl group, $R^{22}$ is an alkyl group having 1 to 18 carbon atoms, $R^{23}$ is a hydrogen atom or a methyl group, $R^{24}$ is a hydrogen atom or an alkyl group having 1 to 18 carbon atoms, $R^{25}$ is a hydrogen atom or a methyl group, $R^{26}$ is an alkyl group having 1 to 18 carbon atoms, or an alkyl group having an ether bond having 1 to 18 carbon atoms, $R^{27}$ is a hydrogen atom or a methyl group, $R^{28}$ is an alkyl group having 1 to 18 carbon atoms, or an alkyl group having an ether bond having 1 to 18 carbon atoms, $L^2$ is a divalent organic group, and n is an integer in a range of 3 to 4, m is an integer in a range of 1 to 200, p is an integer in a range of 1 to 10, and q is an integer in a range of 1 to 100.

2. The coating composition according to claim 1, wherein the silicone chain-containing polymer contains none of an isocyanate group, an epoxy group, a carboxyl group, a carboxylic acid halide group, and a carboxylic acid anhydride group.

3. A resist composition containing comprising the coating composition according to claim 1.

4. The resist composition according to claim 3, wherein the silicone chain-containing polymer contains none of an isocyanate group, an epoxy group, a carboxyl group, a carboxylic acid halide group, and a carboxylic acid anhydride group.

* * * * *